US006980218B1

(12) United States Patent
Demers et al.

(10) Patent No.: US 6,980,218 B1
(45) Date of Patent: Dec. 27, 2005

(54) METHOD AND APPARATUS FOR EFFICIENT GENERATION OF TEXTURE COORDINATE DISPLACEMENTS FOR IMPLEMENTING EMBOSS-STYLE BUMP MAPPING IN A GRAPHICS RENDERING SYSTEM

(75) Inventors: Eric Demers, Redwood City, CA (US); Mark M. Leather, Saratoga, CA (US); Mark G. Segal, Santa Cruz, CA (US)

(73) Assignee: Nintendo Co., Ltd., Kyoto (JP)

(*) Notice: Subject to any disclaimer, the term of this patent is extended or adjusted under 35 U.S.C. 154(b) by 684 days.

(21) Appl. No.: 09/726,218

(22) Filed: Nov. 28, 2000

Related U.S. Application Data

(60) Provisional application No. 60/226,892, filed on Aug. 23, 2000.

(51) Int. Cl.[7] .................................................. G09G 5/00
(52) U.S. Cl. ....................................... 345/584; 345/582
(58) Field of Search ................................ 345/426, 506, 345/501, 582, 584

(56) References Cited

U.S. PATENT DOCUMENTS

| 4,388,620 A | 6/1983 | Sherman |
| 4,425,559 A | 1/1984 | Sherman |
| 4,570,233 A | 2/1986 | Yan et al. |
| 4,658,247 A | 4/1987 | Gharachorloo |
| 4,725,831 A | 2/1988 | Coleman |
| 4,808,988 A | 2/1989 | Burke et al. |
| 4,829,295 A | 5/1989 | Hiroyuki |
| 4,862,392 A | 8/1989 | Steiner |
| 4,866,637 A | 9/1989 | Gonzalez-Lopez et al. |
| 4,901,064 A | 2/1990 | Deering |
| 4,914,729 A | 4/1990 | Omori et al. |
| 4,945,500 A | 7/1990 | Deering |
| 4,974,177 A | 11/1990 | Nishiguchi |
| 5,136,664 A | 8/1992 | Bersack et al. |
| 5,170,468 A | 12/1992 | Shah et al. |
| 5,224,208 A | 6/1993 | Miller, Jr. et al. |
| 5,392,385 A | 2/1995 | Evangelisti et al. |
| 5,392,393 A | 2/1995 | Deering |

(Continued)

FOREIGN PATENT DOCUMENTS

CA      2070934      12/1993

(Continued)

OTHER PUBLICATIONS

GDC 2000: Advanced OpenGL Game Development, "A Practical and Robust Bump-mapping Technique for Today's GPUs," Mark Kilgard, Jul. 5, 2000, www.nvidia.com.

(Continued)

*Primary Examiner*—Sumati Lefkowitz
*Assistant Examiner*—Chante Harrison
(74) *Attorney, Agent, or Firm*—Nixon & Vanderhye P.C.

(57) ABSTRACT

A graphics system including a custom graphics and audio processor produces exciting 2D and 3D graphics and surround sound. The system includes a graphics and audio processor including a 3D graphics pipeline and an audio digital signal processor. Emboss style effects are created using fully pipelined hardware including two distinct dot-product computation units that perform a scaled model view matrix multiply without requiring the Normal input vector and which also compute dot-products between the Binormal and Tangent vectors and a light direction vector in parallel. The resulting texture coordinate displacements are provided to texture mapping hardware that performs a texture mapping operation providing texture combining in one pass. The disclosed pipelined arrangement efficiently provides interesting embossed style image effects such as raised and lowered patterns on surfaces.

12 Claims, 10 Drawing Sheets

U.S. PATENT DOCUMENTS

| | | | |
|---|---|---|---|
| 5,421,028 A | 5/1995 | Swanson | |
| 5,457,775 A | 10/1995 | Johnson, Jr. et al. | |
| 5,504,917 A | 4/1996 | Austin | |
| 5,561,746 A | 10/1996 | Murata et al. | |
| 5,594,854 A | 1/1997 | Baldwin et al. | |
| 5,608,424 A | 3/1997 | Takahashi et al. | |
| 5,621,867 A | 4/1997 | Murata et al. | |
| 5,659,671 A | 8/1997 | Tannenbaum et al. | |
| 5,687,357 A | 11/1997 | Priem | |
| 5,701,444 A | 12/1997 | Baldwin | |
| 5,721,947 A | 2/1998 | Priem et al. | |
| 5,727,192 A | 3/1998 | Baldwin | |
| 5,758,182 A | 5/1998 | Rosenthal et al. | |
| 5,764,243 A | 6/1998 | Baldwin | |
| 5,768,626 A | 6/1998 | Munson et al. | |
| 5,768,629 A | 6/1998 | Wise et al. | |
| 5,774,133 A | 6/1998 | Neave et al. | |
| 5,777,629 A | 7/1998 | Baldwin | |
| 5,798,770 A | 8/1998 | Baldwin | |
| 5,801,706 A | 9/1998 | Fujita et al. | |
| 5,801,716 A | 9/1998 | Silverbrook | |
| 5,805,868 A | 9/1998 | Murphy | |
| 5,808,619 A | 9/1998 | Choi et al. | |
| 5,815,166 A | 9/1998 | Baldwin | |
| 5,821,949 A | 10/1998 | Deering | |
| 5,874,969 A | 2/1999 | Storm et al. | |
| 5,880,736 A | 3/1999 | Peercy et al. | |
| 5,900,881 A | 5/1999 | Ikedo | |
| 5,917,496 A | 6/1999 | Fujita et al. | |
| 5,920,326 A | 7/1999 | Rentschler et al. | |
| 5,940,086 A | 8/1999 | Rentschler et al. | |
| 5,949,424 A | 9/1999 | Cabral et al. | |
| 5,949,440 A | 9/1999 | Krech, Jr. et al. | |
| 5,969,726 A | 10/1999 | Rentschler et al. | |
| 5,999,196 A | 12/1999 | Storm et al. | |
| 6,002,409 A | 12/1999 | Harkin | |
| 6,014,144 A | 1/2000 | Nelson et al. | |
| 6,023,738 A | 2/2000 | Priem et al. | |
| 6,025,853 A | 2/2000 | Baldwin | |
| 6,028,611 A | 2/2000 | Anderson et al. | |
| 6,031,542 A | 2/2000 | Wittig | |
| 6,037,947 A * | 3/2000 | Nelson et al. | 345/426 |
| 6,037,949 A | 3/2000 | DeRose et al. | |
| 6,057,852 A | 5/2000 | Krech, Jr. | |
| 6,078,332 A * | 6/2000 | Ohazama | 345/582 |
| 6,078,334 A | 6/2000 | Hanaoka et al. | |
| 6,081,274 A | 6/2000 | Shiraishi | |
| 6,092,124 A | 7/2000 | Priem et al. | |
| 6,163,319 A * | 12/2000 | Peercy et al. | 345/426 |
| 6,173,367 B1 | 1/2001 | Aleksic et al. | |
| 6,181,352 B1 | 1/2001 | Kirk et al. | |
| 6,198,488 B1 | 3/2001 | Lindholm et al. | |
| 6,226,012 B1 | 5/2001 | Priem et al. | |
| 6,288,730 B1 * | 9/2001 | Duluk et al. | 345/582 |
| 6,452,595 B1 * | 9/2002 | Montrym et al. | 345/426 |
| 6,552,726 B2 * | 4/2003 | Hurley et al. | 345/426 |
| 6,597,363 B1 * | 7/2003 | Duluk et al. | 345/506 |
| 6,717,576 B1 * | 4/2004 | Duluk et al. | 345/506 |
| 2002/0030681 A1 * | 3/2002 | Ritter | 345/426 |

FOREIGN PATENT DOCUMENTS

| | | |
|---|---|---|
| EP | 1 074 945 | 2/2001 |
| EP | 1 075 146 | 2/2001 |
| EP | 1 081 649 | 3/2001 |
| JP | WO 94/10641 | 5/1994 |
| JP | 11053580 | 2/1999 |
| JP | 11076614 | 3/1999 |
| JP | 11161819 | 6/1999 |
| JP | 11203500 | 7/1999 |
| JP | 11226257 | 8/1999 |
| JP | 11259671 | 9/1999 |
| JP | 11259678 | 9/1999 |
| JP | 2000-66985 | 3/2000 |
| JP | 2000-92390 | 3/2000 |
| JP | 2000-132704 | 5/2000 |
| JP | 2000-132706 | 5/2000 |
| JP | 2000-149053 | 5/2000 |
| JP | 2000-156875 | 6/2000 |
| JP | 2000-182077 | 6/2000 |
| JP | 2000-207582 | 7/2000 |
| JP | 2000-215325 | 8/2000 |

OTHER PUBLICATIONS

Technical Presentations: "Texture Space Bump Mapping," Sim Dietrich, Nov. 10, 2000, www.nvidia.com.

Photograph of Sony PlayStation II System.

Photograph of Sega Dreamcast System.

Photograph of Nintendo 64 System.

Whitepaper: 3D Graphics Demystified, Nov. 11, 1999, www.nvidia.com.

Whitepaper: "Z Buffering, Interpolation and More W-Buffering", Doug Rogers, Jan. 31, 2000, www.nvidia.com.

Whitepaper: Using GL_NV_vertex _array and GL_NV_fence, posted Aug. 1, 2000,www.nvidia.com.

Whitepaper: Anisotropic Texture Filtering in OpenGL, posted Jul. 17, 2000, www.nvidia.com.

Whitepaper: Mapping Texels to Pixels in D3D, posted Apr. 5, 2000, www.nvidia.com.

Whitepaper: Guard Band Clipping, posted Jan. 31, 2000, www.nvidia.com.

Whitepaper: Cube Environment Mapping, posted Jan. 14, 2000, www.nvidia.com.

Whitepaper: Color Key in D3D, posted Jan. 11, 2000, www.nvidia.com.

Whitepaper: Vertex Blending Under DX7 for the GeForce 256, Jan. 5, 2000, www.nvidia.com.

Whitepaper: Optimizing Direct3D for the GeForce 256, Jan. 3, 2000, www.nvidia.com.

Whitepaper: Dot Product Texture Blending, Dec. 3, 1999, www.nvidia.com.

Whitepaper: Technical Brief: AGP 4X with Fast Writes, Nov. 10, 1999, www.nvidia.com.

Technical Brief: Transform and Lighting, Nov. 10, 1999, www.nvidia.com.

Technical Brief: What's New With Microsoft DirectX7, posted Nov. 10, 1999, www.nvidia.com.

Mitchell et al., "Multitexturing in DirectX6", Game Developer, Sep. 1998, www.gdmag.com.

VisionTek, "GeForce2 GS Graphics Processing Unit", ©2000 www.visiontek.com.

Jim Bushnell et al. "Advanced Multitexture Effects With Direct3D and OpenGL", Pyramid Peak Design & ATI Research, Inc., GameDevelopers Conference, ©1999.

Sony PlayStation II Instruction Manual, Sony Computer Entertainment Inc., ©2000.

Stand and Be Judged, Next Generation, May 2000.

PlayStation II: Hardware Heaven or Hell?, Next Generation, Jan. 2000.

Chris Charla, "Play Station II: The Latest News", Next Generation, Sep. 1999.

"First Playstation II Gameplay Screens Revealed!", Next Generation, Sep. 1999.

Game Enthusiast Online Highlights, Mar. 18, 1999.

Game Enthusiast Online Highlights, Mar. 19, 1999.

Game Enthusiast Online Highlights, Mar. 17, 1999.

Game Enthusiast Online Highlights, Oct. 20, 1999.

Joel Easley, "PlayStation II Revealed", Game Week, Sep. 29, 1999.
Inside Sony'Next Generation Playstation, ©1999.
Press Releases, Mar. 18, 1999.
Chris Johnston, "PlayStation Part Deux", Press Start, ©1999.
Nikkei Shimbun, "Sony Making SME, Chemical and SPT into Wholly-Owned Subsidiaries", Mar. 9, 1999.
AM News: Japanese Developers Not All Sold on PS2, Next Generation, Mar. 16, 1999.
Sony To Turn PlayStation Maker Into Wholly Owned Unit-Nikkei, Dow Jones News Service, Mar. 8, 1999.
Yumiko Ono, Sony Antes Up Its Chips In Bet On New Games System, Dow Jones News Service, Mar. 4, 1999.
MacWeek.Com Gets Inside Story on Connectix VGS for Windows; Controversial Emulator of Sony PlayStation Games Cureently Available for Macs Only, Business Wire, Mar. 12, 1999.
"DexDrive Bridges Gap", The Tampa Tribune, Mar. 12, 1999.
A Microprocessor With a 128b CPU, 10 Floating-Point MAC's, 4 Floating-Point Dividers, and an MPEG2 Decoder, 1999 IEEE International Solid-State Circuits Conference, Feb. 16, 1999.
Dreamcast Instruction Manual, Sega Enterprises, Ltd., ©1998.
"Sega To Launch Video Camera for Dreamcast", Reuters Business News, Feb. 16, 2000.
David Pescovitz, "Dream On", Wired, Aug. 1999.
Randy Nelson, "Dreamcast 101: Everything You Ever Wanted To Know About Sega'Powerful New Console", Official Sega Dreamcast Magazine, Jun. 1999.
2D/3D Graphics Card User Manual, Guillemot ©1999.
Nintendo 64 Instruction Booklet, Nintendo of America, 1998.
Steven Levy, "Here Comes PlayStation II" Newsweek, Mar. 6, 2000.
David Sheff, "Sony Smackage: Test Driving The PlayStation II", Wired Nov. 1999.
Introducing The Next Generation PlayStation, Sony Computer Entertainment Inc., ©1999.
Leadtek GTS, Aug. 3, 2000, www.hexus.net.
Voodoo 5 5500 Review, Jul. 26, 2000, www.hexus.net.
ATI Radeon 64 Meg DDR OEM, Aug. 19, 2000, www.hexus.net.
Microsoft Xbox—The Future of Gaming, Microsoft Xbox Performance Sheet, www.xbox.com.
Robert L. Cook, "Shade Trees", Computer Graphics, vol. 18, No. 3 Jul. 1984.
Wang et al., "Second-Depth Shadow Mapping", Department of Computer Science, Univ. N.C, Chapel Hill, N.C. pp. 1-7.
Peercy et al., "Efficient Bump Mapping Hardware", Computer Graphics Proceedings, Annual Conference Series, 1997.
Gustavo Oliveira, "Refractive Texture Mappig, Part One", www.gamasutra.com, Nov. 10, 2000.
John Schlag, Fast Embossing Effects on Raster Image Data, Graphics Gems IV, Edited by Paul S. Heckbert, Computer Science Department, Carnegie Mellon University, Academic Press, Inc., 1994,pp.433-437.
James F. Blinn, "Simulationof Wrinkled Surfaces," Caltech/JPL, pp. 286-292, SIGGRAPH 78 (1978).
Tomas Möller and Eric Haines "Real-Time Rendering", AK Peters, Ltd., ©1999, pp. 127-142.
Technical Presentation: Vertex Buffers, posted Jun. 12, 2000, www.nvidia.com.
Technical Presentation: Hardware Transform and Lighting, www.nvidia.com, posted Jun. 12, 2000.
Technical Presentation: Hardware Bump-mapping Choices and Concepts, Jun. 7, 2000, www.nvidia.com.
Technical Presentation: How to Bump Map a Skinned Polygonal Model, Jun. 7, 2000, www.nvidia.com.
Technical Presentation: Computations for Hardware Lighting and Shading, Mar. 17, 2000, www.nvidia.com.
Technical Presentation: Practical Bump-mapping for Today's GPUs, Mar. 17, 2000 www.nvidia.com.
Technical Presentation: Shadows, Transparency, & Fog, Mar. 17, 2000 www.nvidia.com.
Technical Presentation: GeForce 256 Register Combiners, Mar. 17, 2000, www.nvidia.com.
Technical Presentation: TexGen & The Texture Matrix, Mar. 15, 2000 www.nvidia.com.
Technical Presentation: Toon Shading, Mar. 15, 2000, www.nvidia.com.
Technical Presentation: D3D 7 Vertex Lighting, Mar. 15, 2000, www.nvidia.com.
Technical Presentation: Per-Pixel Lighting (by S. Dietrich) Mar. 14, 2000 www.nvidia.com.
Technical Presentation: GeForce 256 and RIVA TNT Combiners, Dec. 8, 1999, www.nvidia.com.
Technical Presentation: Vertex Caching Optimization, Nov. 12, 1999, www.nvidia.com.
Technical Presentation: Vertex Blending, Nov. 12, 1999, www.nvidia.com.
Technical Presentation: Hardware Transform and Lighting, Nov. 12, 1999, www.nvidia.com.
Technical Presentation: GeForce 256 Overview, Nov. 12, 1999, www.nvidia.com.
Technical Presentation: DirectX 7 and Texture Management, Nov. 12, 1999 www.nvidia.com.
Technical Presentation: Dot Product Lighting, Nov. 12, 1999, www.nvidia.com.
Technical Presentation: Texture Coordinate Generation, Nov. 3, 1999, www.nvidia.com.
Technical Presentation: Phong Shading and Lightmaps, Nov. 3, 1999, www.nvidia.com.
Technical Presentation: The ARB_multitexture Extension, Nov. 3, 1999 www.nvidia.com.
Technical Presentation: Multitexture Combiners, Nov. 3, 1999, www.nvidia.com.
Technical Presentation: Emboss Bump Mapping, Nov. 3, 1999, www.nvidia.com.
Technical Presentation: Hardware Accelerated Anisotropic Lighting, Nov. 3, 1999, www.nvidia.com.
Technical Presentation: Guard Band Clipping, Nov. 3, 1999, www.nvidia.com.
The RenderMan Interface, Stephan R. Keith, Version 3.1, Pixar Animation Studios, Sep. 1989.
The RenderMan Interface, Version 3.2, Pixar Animation Studios, Jul. 2000, www.pixar.com.
NVIDIA Product Overview, "GeForce2Ultra", NVIDIA Corporation, Aug. 21, 2000, www.nvidia.com.
Duke, "Dreamcast Technical Specs", Sega Dreamcast Review, Sega, Feb. 1999, www.game-revolution.com.
Marlin Rowley "GeForce 1 & 2 GPU Speed Tests", May 11, 2000, www.g256.com.
"Dreamcast: The Full Story", Next Generation, Sep. 1998.
Direct 7.0 Programmer's Reference, Microsoft Corporation, 1995-1999 (as part of the DirectX 7.0 SDK on the Companion CD included with "Inside Direct3D", Microsoft Programming Series, Peter J. Kovach, Microsoft Press, 1999).

"Inside Direct3D", Microsoft Programming Series, Peter J. Kovach, Microsoft Press, 1999.

"OpenGL Programming Guide, The Official Guide to Learning OpenGL, Release 1", Jackie Nieder, Tom David, Mason Woo, Addision-Wesley Publishing Co., 1993.

"Procedural Elements for Computer Graphics," Second Edition, David F. Rogers, McGraw Hill, 1998.

"Real-Time Rendering," Tomas Molleir, Eric Haines, AK Peters, 1999.

"Computer Graphics, Priniciples and Practices," Second Edition, The Systems Programming Series, Foley, van Dam, Fiener, Hughes, Addision Wesley, 1990.

"Principles of Three-Dimensional Computer Animation", Revised Edition, Michael O'Rourke, W.W. Norton & Company, 1998.

* cited by examiner

Fig. 5  EXAMPLE GRAPHICS PROCESSOR FLOW

METHOD AND APPARATUS FOR EFFICIENT GENERATION OF TEXTURE COORDINATE DISPLACEMENTS FOR IMPLEMENTING EMBOSS-STYLE BUMP MAPPING IN A GRAPHICS RENDERING SYSTEM

CROSS-REFERENCE TO RELATED APPLICATIONS

This application claims the benefit of U.S. Provisional Application Ser. No. 60/226,892, filed Aug. 23, 2000, the entire content of which is hereby incorporated by reference.

This application is also related to the following commonly assigned co-pending applications identified below, which focus on various aspects of the graphics system described herein. Each of the following applications are incorporated herein by reference:

provisional Application No. 60/161,915, filed Oct. 28, 1999 and its corresponding utility application Ser. No. 09/465,754, filed Dec. 17, 1999, both entitled "Vertex Cache For 3D Computer Graphics";

provisional Application No. 60/226,912, filed Aug. 23, 2000 and its corresponding utility application Ser. No. 09/726,215, filed Nov. 28, 2000, both entitled "Method and Apparatus for Buffering Graphics Data in a Graphics System ";

provisional Application No. 60/226,889, filed Aug. 23, 2000 and its corresponding utility application Ser. No. 09/722,419, filed Nov. 28, 2000, both entitled "Graphics Pipeline Token Synchronization";

provisional Application No. 60/226,891, filed Aug. 23, 2000 and its corresponding utility application Ser. No. 09/722,382, filed Nov. 28, 2000, both entitled "Method And Apparatus For Direct and Indirect Texture Processing In A Graphics System";

provisional Application No. 60/226,888, filed Aug. 23, 2000 and its corresponding utility application Ser. No. 09/722,367, filed Nov. 28, 2000, both entitled "Recirculating Shade Tree Blender For A Graphics System";

provisional Application No. 60/226,893, filed Aug. 23, 2000 and its corresponding utility application Ser. No. 09/722,381 filed Nov. 28, 2000, both entitled "Method And Apparatus For Environment-Mapped Bump-Mapping In A Graphics System";

provisional Application No. 60/227,007, filed Aug. 23, 2000 and its corresponding utility application Ser. No. 09/726,216, filed Nov. 28, 2000, both entitled "Achromatic Lighting in a Graphics System and Method";

provisional Application No. 60/226,900, filed Aug. 23, 2000 and its corresponding utility application Ser. No. 09/726,226, filed Nov. 28, 2000, both entitled "Method And Apparatus For Anti-Aliasing In A Graphics System";

provisional Application No. 60/226,910, filed Aug. 23, 2000 and its corresponding utility application Ser. No. 09/722,380, filed Nov. 28, 2000, both entitled "Graphics System With Embedded Frame Buffer Having Reconfigurable Pixel Formats";

utility application Ser. No. 09/585,329, filed Jun. 2, 2000, entitled "Variable Bit Field Color Encoding";

provisional Application No. 60/226,890, filed Aug. 23, 2000 and its corresponding utility application Ser. No. 09/726,227, filed Nov. 28, 2000, both entitled "Method And Apparatus For Dynamically Reconfiguring The Order Of Hidden Surface Processing Based On Rendering Mode";

provisional Application No. 60/226,915, filed Aug. 23, 2000 and its corresponding utility application Ser. No. 09/726,212 filed Nov. 28, 2000, both entitled "Method And Apparatus For Providing Non-Photorealistic Cartoon Outlining Within A Graphics System";

provisional Application No. 60/227,032, filed Aug. 23, 2000 and its corresponding utility application Ser. No. 09/726,225, filed Nov. 28, 2000, both entitled "Method And Apparatus For Providing Improved Fog Effects In A Graphics System";

provisional Application No. 60/226,885, filed Aug. 23, 2000 and its corresponding utility application Ser. No. 09/722,664, filed Nov. 28, 2000, both entitled "Controller Interface For A Graphics System";

provisional Application No. 60/227,033, filed Aug. 23, 2000 and its corresponding utility application Ser. No. 09/726,221, filed Nov. 28, 2000, both entitled "Method And Apparatus For Texture Tiling In A Graphics System";

provisional Application No. 60/226,899, filed Aug. 23, 2000 and its corresponding utility application Ser. No. 09/722,667, filed Nov. 28, 2000, both entitled "Method And Apparatus For Pre-Caching Data In Audio Memory";

provisional Application No. 60/226,913, filed Aug. 23, 2000 and its corresponding utility application Ser. No. 09/722,378, filed Nov. 28, 2000, both entitled "Z-Texturing";

provisional Application No. 60/227,031, filed Aug. 23, 2000 entitled "Application Program Interface for a Graphics System", provisional Application No. 60/227,030, filed Aug. 23, 2000 and its corresponding utility application Ser. No. 09/722,663, filed Nov. 28, 2000, both entitled "Graphics System With Copy Out Conversions Between Embedded Frame Buffer And Main Memory";

provisional Application No. 60/226,886, filed Aug. 23, 2000 and its corresponding utility application Ser. No. 09/722,665, filed Nov. 28, 2000, both entitled "Method and Apparatus for Accessing Shared Resources";

provisional Application No. 60/226,894, filed Aug. 23, 2000 and its corresponding utility application Ser. No. 09/726,220, filed Nov. 28, 2000, both entitled "Graphics Processing System With Enhanced Memory Controller";

provisional Application No. 60/226,914, filed Aug. 23, 2000 and its corresponding utility application Ser. No. 09/722,390, filed Nov. 28, 2000, both entitled "Low Cost Graphics System With Stitching Hardware Support For Skeletal Animation", and provisional Application No. 60/227,006, filed Aug. 23, 2000 and its corresponding utility application Ser. No. 09/722,421, filed Nov. 28, 2000, both entitled "Shadow Mapping In A Low Cost Graphics System".

FIELD OF THE INVENTION

The present invention relates to computer graphics, and more particularly to interactive graphics systems such as home video game platforms. Still more particularly this invention relates to efficient generation of texture coordinate displacements for implementing emboss-style bump-mapping effects for diffuse-lit textures on a rendered object.

BACKGROUND AND SUMMARY OF THE INVENTION

Many of us have seen films containing remarkably realistic dinosaurs, aliens, animated toys and other fanciful creatures. Such animations are made possible by computer graphics. Using such techniques, a computer graphics artist can specify how each object should look and how it should change in appearance over time, and a computer then models the objects and displays them on a display such as your television or a computer screen. The computer takes care of performing the many tasks required to make sure that each part of the displayed image is colored and shaped just right based on the position and orientation of each object in a scene, the direction in which light seems to strike each object, the surface texture of each object, and other factors.

Because computer graphics generation is complex, computer-generated three-dimensional graphics just a few years ago were mostly limited to expensive specialized flight simulators, high-end graphics workstations and supercomputers. The public saw some of the images generated by these computer systems in movies and expensive television advertisements, but most of us couldn't actually interact with the computers doing the graphics generation. All this has changed with the availability of relatively inexpensive 3D graphics platforms such as, for example, the Nintendo 64® and various 3D graphics cards now available for personal computers. It is now possible to interact with exciting 3D animations and simulations on relatively inexpensive computer graphics systems in your home or office.

One problem that graphics system designers have often confronted in the past was the efficient rendering of a 3D object that displays realistic-looking surface characteristics that react to various lighting conditions in a manner similar to the surface of an actual object having, for example, random surface flaws, irregularities, roughness, bumps or other slight non-planar surface variations. While in some instances such minute surface characteristics might be actually modeled, the time required for translating and rendering a 3D object with such a complex surface would be prohibitive for most real-time or interactive gaming applications. Consequently, various solutions to this problem were offered. For example, a technique generally known as "bump-mapping" was developed which allowed one to approximate the effect that non-planar surface variations would produce on lighted object. See, for example, J. F. Blinn "Simulation of Wrinkled Surfaces" *Computer Graphics*, (SIGRAPH '78 Proceedings), vol. 12, No. 3, pp. 286–292 (August 1978); "Models of Light Reflection for Computer Synthesized Pictures", Proc. $4^{th}$ Conference on Computer Graphics and Instructive Techniques, 1977; and "Programming with OpenGL: Advanced Rendering" by Tom McReynolds and David Blythe—*SIGGRAPH '97 course*—Section 8.3 "Bump Mapping with Textures". Basically, this technique allows a graphics application programmer to add realism to an image without using a lot of geometry by modeling small surface variations as height differences and then applying those difference values over a surface as perturbations to a surface Normal vector used in computing surface lighting effects. Effectively, a bump-map modifies the shading of a polygon by perturbing the surface Normal on a per-pixel basis. The shading makes the surface appear bumpy, even though the underlying geometry is relatively flat.

Most conventional approaches toward implementing simple forms of bump-mapping effects with diffuse-lit textured surfaces generally entail computing, for each pixel, the difference between a first sample of a bump map texture image at a particular texture coordinate and a second sample of the same texture image at a texture coordinate displacement. In addition, computing a texture coordinate displacement map generally involves computations using eye-space components of surface Tangent and Binormal vectors (binormals). In particular, to implement a simple form of bump-mapping having an embossing type effect on a texture image, it is most efficient to compute and apply the texture coordinate displacements in the eye-space (view-space/camera-space) reference frame—which is more conducive to a subsequent rasterizing process prior rendering for display. Consequently, texture coordinate displacement for emboss-style bump-mapping is preferably computed and generated after vertex position and surface binormals at a vertex are transformed from model-space into eye-space for pixel rendering.

Typically, in low cost graphics processing systems such as a home video game system, vertex transformation and lighting (T&L) operations are commonly performed by the application program using the graphics system host CPU—primarily because a software T&L implementation, although more computationally taxing on the host CPU, is usually less expensive than using specialized hardware. Hardware implementation of T&L, however, may be preferable in gaming systems because it typically results in much faster renderings and can free up host CPU processing time for performing other desirable tasks such as game strategy and AI computations for improved game performance. Moreover, in graphics rendering arrangements where T&L operations are performed by the application software on the host CPU, additional processing tasks such as performing texture coordinate computations for bump-mapping can significantly add to the processing overhead.

In graphics rendering systems where the T&L operations are performed by dedicated graphics hardware, the host CPU typically provides model-space vertex attributes to the dedicated T&L hardware and then allows the hardware to perform all the coordinate space transformations and lighting computations. Consequently, it is not particularly efficient to require the host CPU to compute texture coordinate displacements for bump mapping purposes subsequent to the T&L hardware performing space transformations of the vertex position and surface normal/binormal vectors. Essentially, this would effectively undermine rendering speed improvements gained from utilizing dedicated T&L hardware whenever bump mapping operations are performed.

The present invention solves this problem by providing techniques and arrangements in a graphics rendering system for the efficient generation of texture coordinate displacements for implementing at least an emboss-style bump-mapping texture effect without the need for the host CPU application software to compute the required texture coordinate displacements. An enhanced API (applications program interface) vertex attribute function capable of specifying three surface normals per vertex (i.e., the Normal, Tangent and Binormal) is utilized and the host CPU application software need only compute the required additional Tangent and Binormal surface vectors per vertex in object-space (model-space), in addition to providing the surface Normal and other conventional per-vertex attributes.

Some of the features provided by aspects of this invention include:
    use of a texture-combining unit capable of performing texture subtraction in one pass,
    use of texture combining for bump mapping that performs texture combining in texture hardware, scaling of the binormals (Tangent and Binormal) by scaling a model view matrix and applying the model view matrix to the binormals, computation of texture displacements using the Binormal and Tangent vectors but not the Normal input vector, increased performance through use of two distinct dot product computation units (one dot unit performs model view matrix multiply, the second computes in parallel the dot products of the Tangent and Binormal with the light direction vector as well as the square of the light direction vector), fully pipelined hardware can perform the necessary computations using a small number of distinct operations.

In accordance with one aspect of the present invention, a graphics rendering system is provided with enhanced vertex transformation and lighting (T&L) hardware that is capable of performing at least simple emboss-style bump-mapping in addition to the conventional T&L operations. This style of bump-mapping is useful when the surface geometry of an object is being animated. The vector geometry processing portion of the T&L hardware is enhanced to accommodate processing a transformation of object-space vertex surface binormals (i.e., the Tangent and Binormal vectors) to eye-space and the computation of a texture coordinate displacement based on light direction (light-to-vertex) vector dot products with the transformed binormals.

In accordance with another aspect of the present invention, an enhanced vertex attribute description API function provides three vertex surface normals (N, B and T) to the T&L vector geometry processing hardware along with vertex position and light source position. The geometry processing hardware then transforms the surface normals to eye-space, computes the light vector in eye-space and uses the vector components to compute the appropriate texture coordinate displacements for use in producing an emboss-style bump mapped texture effect.

BRIEF DESCRIPTION OF THE DRAWINGS

These and other features and advantages provided by the invention will be better and more completely understood by referring to the following detailed description of presently preferred embodiments in conjunction with the drawings, of which.

DETAILED DESCRIPTION OF EXAMPLE EMBODIMENTS OF THE INVENTION

Figure 1:
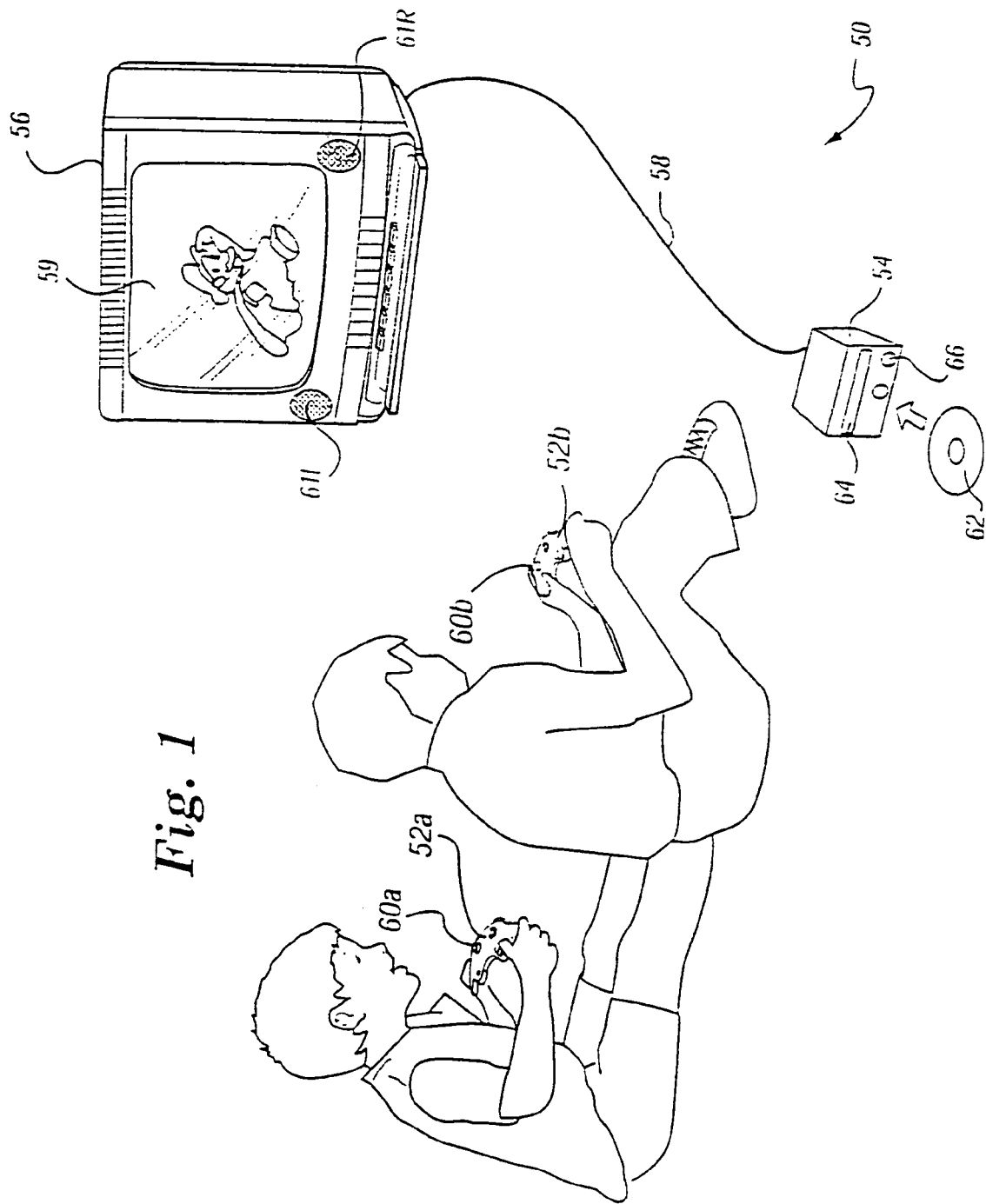
FIG. 1 is an overall view of an example interactive computer graphics system.

FIG. 1 shows an example interactive 3D computer graphics system 50. System 50 can be used to play interactive 3D video games with interesting stereo sound. It can also be used for a variety of other applications.

In this example, system 50 is capable of processing, interactively in real time, a digital representation or model of a three-dimensional world. System 50 can display some or all of the world from any arbitrary viewpoint. For example, system 50 can interactively change the viewpoint in response to real time inputs from handheld controllers 52a, 52b or other input devices. This allows the game player to see the world through the eyes of someone within or outside of the world. System 50 can be used for applications that do not require real time 3D interactive display (e.g., 2D display generation and/or non-interactive display), but the capability of displaying quality 3D images very quickly can be used to create very realistic and exciting game play or other graphical interactions.

To play a video game or other application using system 50, the user first connects a main unit 54 to his or her color television set 56 or other display device by connecting a cable 58 between the two. Main unit 54 produces both video signals and audio signals for controlling color television set 56. The video signals are what controls the images displayed on the television screen 59, and the audio signals are played back as sound through television stereo loudspeakers 61L, 61R.

The user also needs to connect main unit 54 to a power source. This power source may be a conventional AC adapter (not shown) that plugs into a standard home electrical wall socket and converts the house current into a lower DC voltage signal suitable for powering the main unit 54. Batteries could be used in other implementations.

The user may use hand controllers 52a, 52b to control main unit 54. Controls 60 can be used, for example, to specify the direction (up or down, left or right, closer or further away) that a character displayed on television 56 should move within a 3D world. Controls 60 also provide input for other applications (e.g., menu selection, pointer/cursor control, etc.). Controllers 52 can take a variety of forms. In this example, controllers 52 shown each include controls 60 such as joysticks, push buttons and/or directional switches. Controllers 52 may be connected to main unit 54 by cables or wirelessly via electromagnetic (e.g., radio or infrared) waves.

To play an application such as a game, the user selects an appropriate storage medium 62 storing the video game or other application he or she wants to play, and inserts that storage medium into a slot 64 in main unit 54. Storage medium 62 may, for example, be a specially encoded and/or encrypted optical and/or magnetic disk. The user may operate a power switch 66 to turn on main unit 54 and cause the main unit to begin running the video game or other application based on the software stored in the storage medium 62. The user may operate controllers 52 to provide inputs to main unit 54. For example, operating a control 60 may cause the game or other application to start. Moving other controls 60 can cause animated characters to move in different directions or change the user's point of view in a 3D world. Depending upon the particular software stored within the storage medium 62, the various controls 60 on the controller 52 can perform different functions at different times.

Example Electronics of Overall System

Figure 2:
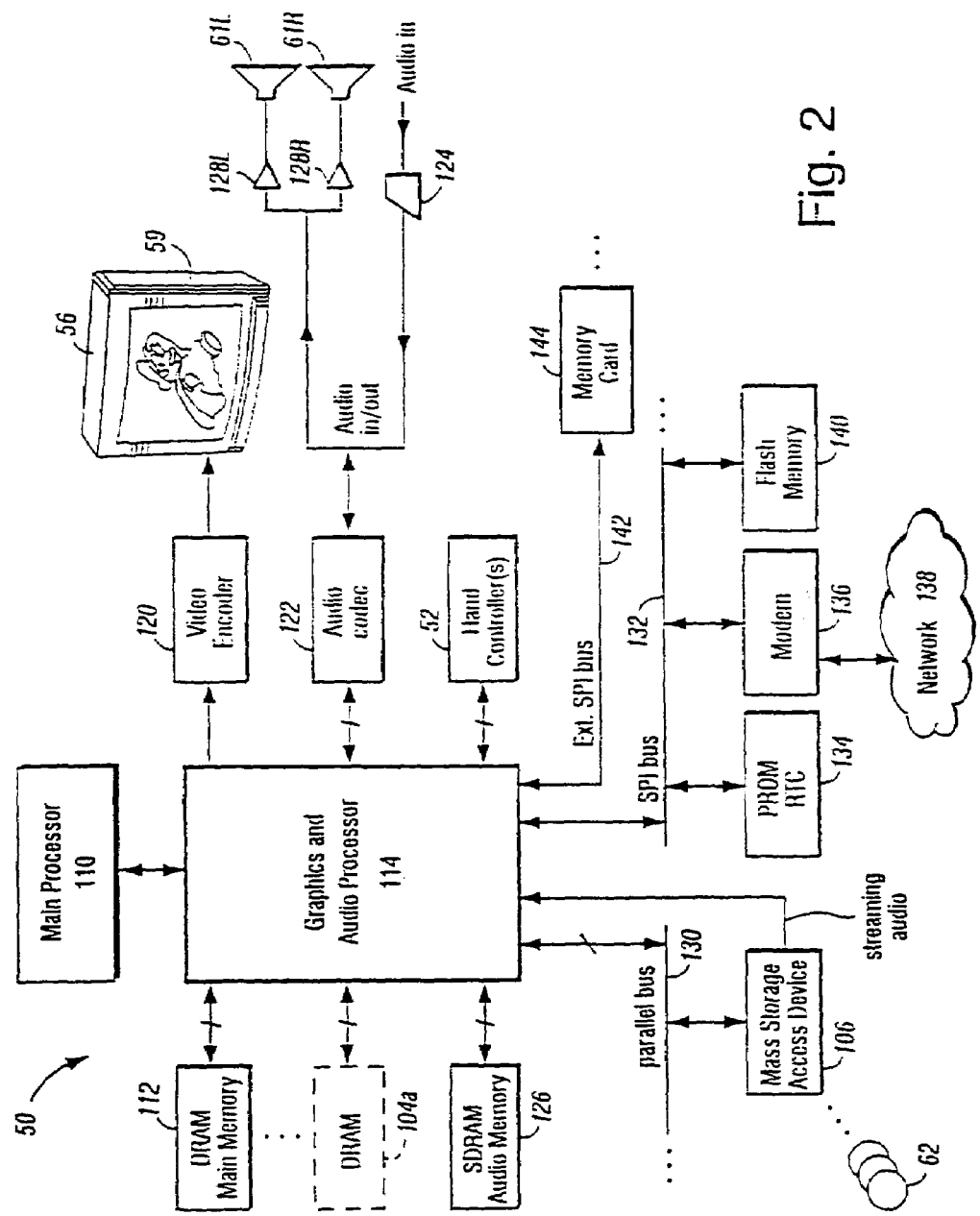
FIG. 2 is a block diagram of the FIG. 1 example computer graphics system.

FIG. 2 shows a block diagram of example components of system 50. The primary components include:
- a main processor (CPU) 110,
- a main memory 112, and
- a graphics and audio processor 114.

In this example, main processor 110 (e.g., an enhanced IBM Power PC 750) receives inputs from handheld controllers 108 (and/or other input devices) via graphics and audio processor 114. Main processor 110 interactively responds to user inputs, and executes a video game or other program supplied, for example, by external storage media 62 via a mass storage access device 106 such as an optical disk drive. As one example, in the context of video game play, main processor 110 can perform collision detection and animation processing in addition to a variety of interactive and control functions.

In this example, main processor 110 generates 3D graphics and audio commands and sends them to graphics and audio processor 114. The graphics and audio processor 114 processes these commands to generate interesting visual images on display 59 and interesting stereo sound on stereo loudspeakers 61R, 61L or other suitable sound-generating devices.

Example system 50 includes a video encoder 120 that receives image signals from graphics and audio processor 114 and converts the image signals into analog and/or digital video signals suitable for display on a standard display device such as a computer monitor or home color television set 56. System 50 also includes an audio codec (compressor/decompressor) 122 that compresses and decompresses digitized audio signals and may also convert between digital and analog audio signaling formats as needed. Audio codec 122 can receive audio inputs via a buffer 124 and provide them to graphics and audio processor 114 for processing (e.g., mixing with other audio signals the processor generates and/or receives via a streaming audio output of mass storage access device 106). Graphics and audio processor 114 in this example can store audio related information in an audio memory 126 that is available for audio tasks. Graphics and audio processor 114 provides the resulting audio output signals to audio codec 122 for decompression and conversion to analog signals (e.g., via buffer amplifiers 128L, 128R) so they can be reproduced by loudspeakers 61L, 61R.

Graphics and audio processor 114 has the ability to communicate with various additional devices that may be present within system 50. For example, a parallel digital bus 130 may be used to communicate with mass storage access device 106 and/or other components. A serial peripheral bus 132 may communicate with a variety of peripheral or other devices including, for example:
- a programmable read-only memory and/or real time clock 134,
- a modem 136 or other networking interface (which may in turn connect system 50 to a telecommunications network 138 such as the Internet or other digital network from/to which program instructions and/or data can be downloaded or uploaded), and
- flash memory 140.

A further external serial bus 142 may be used to communicate with additional expansion memory 144 (e.g., a memory card) or other devices. Connectors may be used to connect various devices to busses 130, 132, 142.

Example Graphics And Audio Processor

Figure 3:
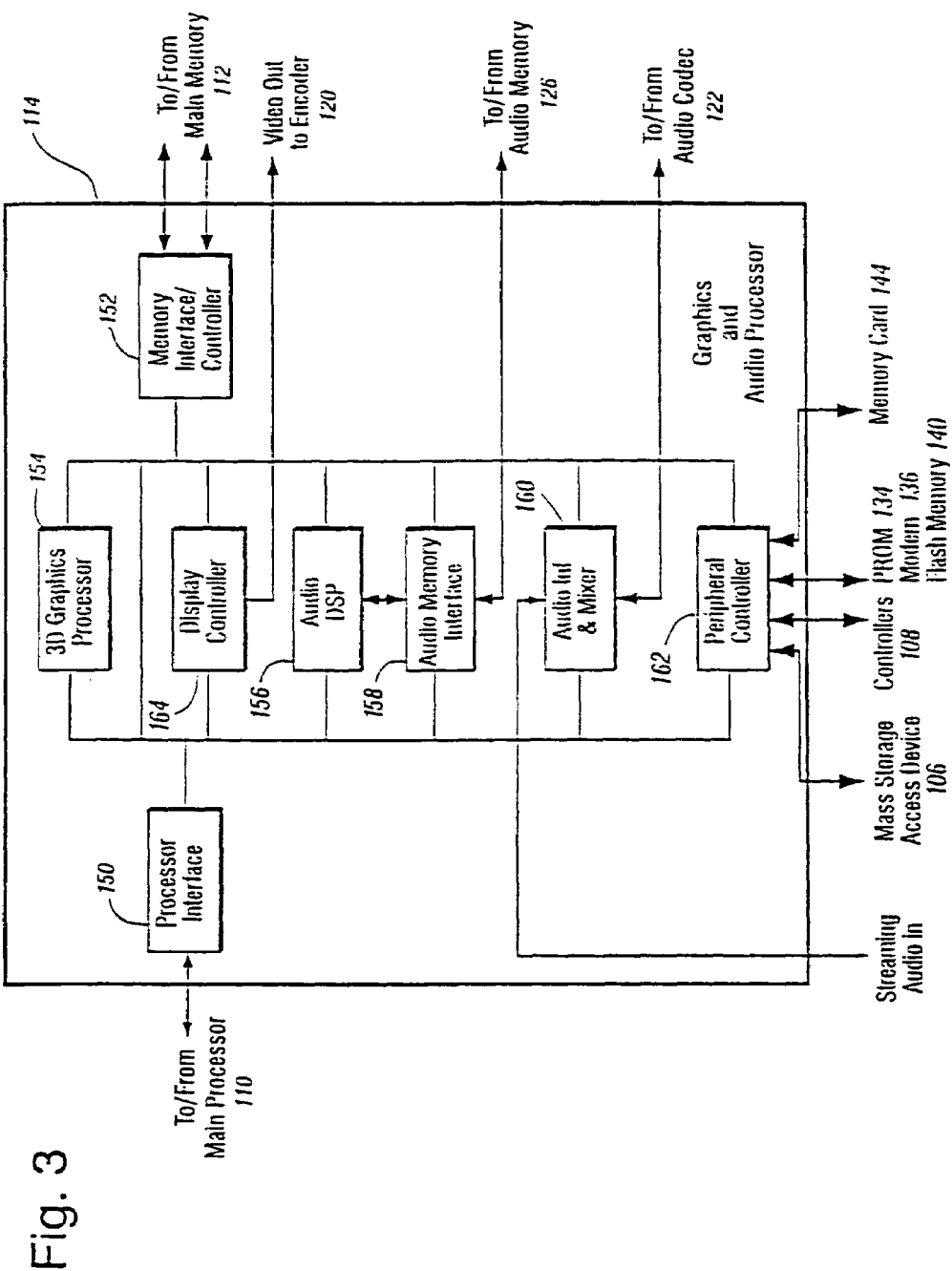
FIG. 3 is a block diagram of the example graphics and audio processor shown in FIG. 2.

FIG. 3 is a block diagram of an example graphics and audio processor 114. Graphics and audio processor 114 in one example may be a single-chip ASIC (application specific integrated circuit). In this example, graphics and audio processor 114 includes:
- a processor interface 150,
- a memory interface/controller 152,
- a 3D graphics processor 154,
- an audio digital signal processor (DSP) 156,
- an audio memory interface 158,
- an audio interface and mixer 160,
- a peripheral controller 162, and
- a display controller 164.

3D graphics processor 154 performs graphics processing tasks. Audio digital signal processor 156 performs audio processing tasks. Display controller 164 accesses image information from main memory 112 and provides it to video encoder 120 for display on display device 56. Audio interface and mixer 160 interfaces with audio codec 122, and can also mix audio from different sources (e.g., streaming audio from mass storage access device 106, the output of audio DSP 156, and external audio input received via audio codec 122). Processor interface 150 provides a data and control interface between main processor 110 and graphics and audio processor 114.

Memory interface 152 provides a data and control interface between graphics and audio processor 114 and memory 112. In this example, main processor 110 accesses main memory 112 via processor interface 150 and memory interface 152 that are part of graphics and audio processor 114. Peripheral controller 162 provides a data and control interface between graphics and audio processor 114 and the various peripherals mentioned above. Audio memory interface 158 provides an interface with audio memory 126.

Example Graphics Pipeline

Figure 4:
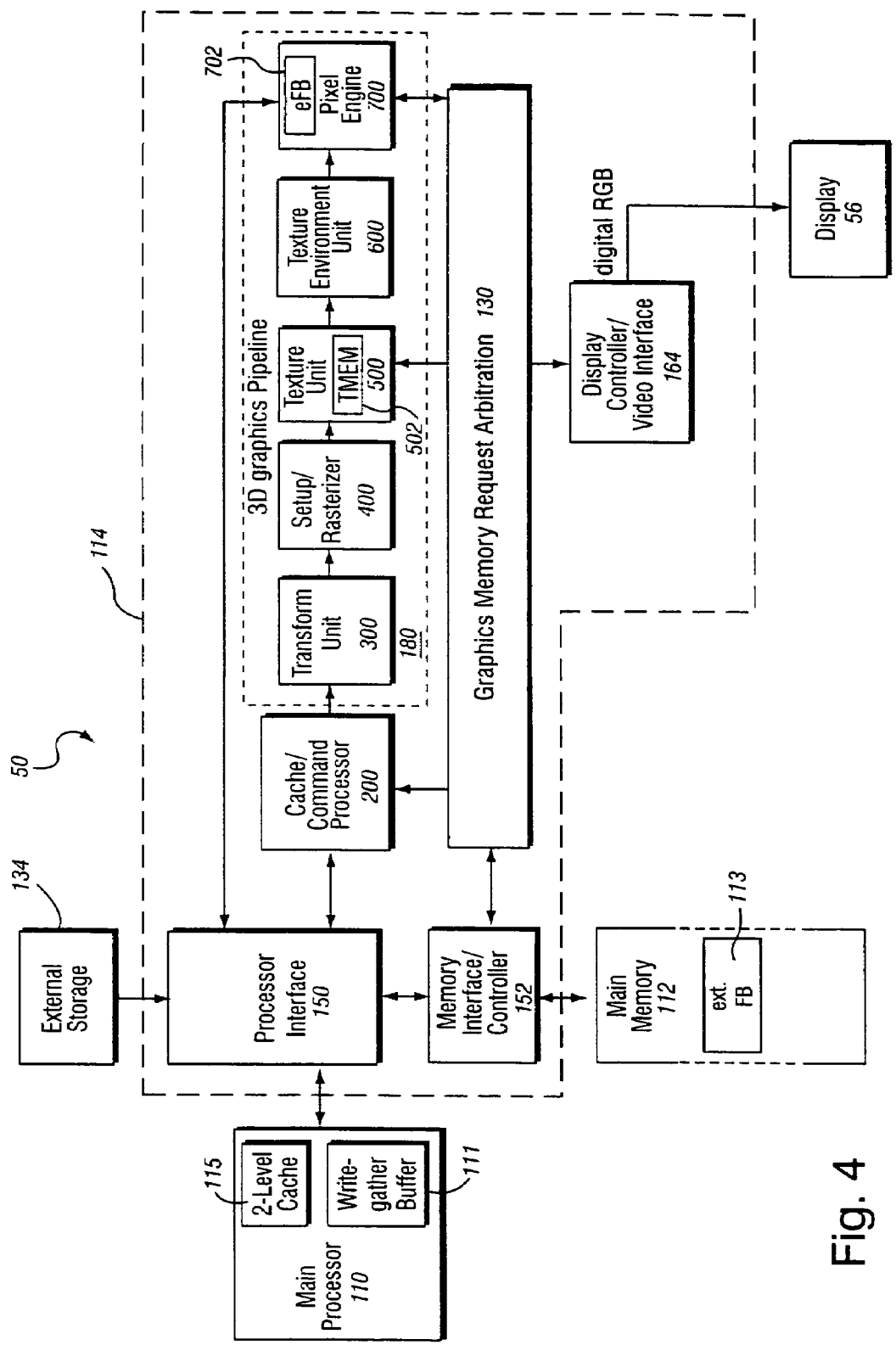
FIG. 4 is a block diagram of the example 3D graphics processor shown in FIG. 3.

FIG. 4 shows a more detailed view of an example 3D graphics processor 154. 3D graphics processor 154 includes, among other things, a command processor 200 and a 3D graphics pipeline 180. Main processor 110 communicates streams of data (e.g., graphics command streams and display lists) to command processor 200. Main processor 110 has a two-level cache 115 to minimize memory latency, and also has a write-gathering buffer 111 for un-cached data streams targeted for the graphics and audio processor 114. The write-gathering buffer 111 collects partial cache lines into full cache lines and sends the data out to the graphics and audio processor 114 one cache line at a time for maximum bus usage.

Command processor 200 receives display commands from main processor 110 and parses them—obtaining any additional data necessary to process them from shared memory 112. The command processor 200 provides a stream of vertex commands to graphics pipeline 180 for 2D and/or 3D processing and rendering. Graphics pipeline 180 generates images based on these commands. The resulting image information may be transferred to main memory 112 for access by display controller/video interface unit 164—which displays the frame buffer output of pipeline 180 on display 56.

Figure 5:
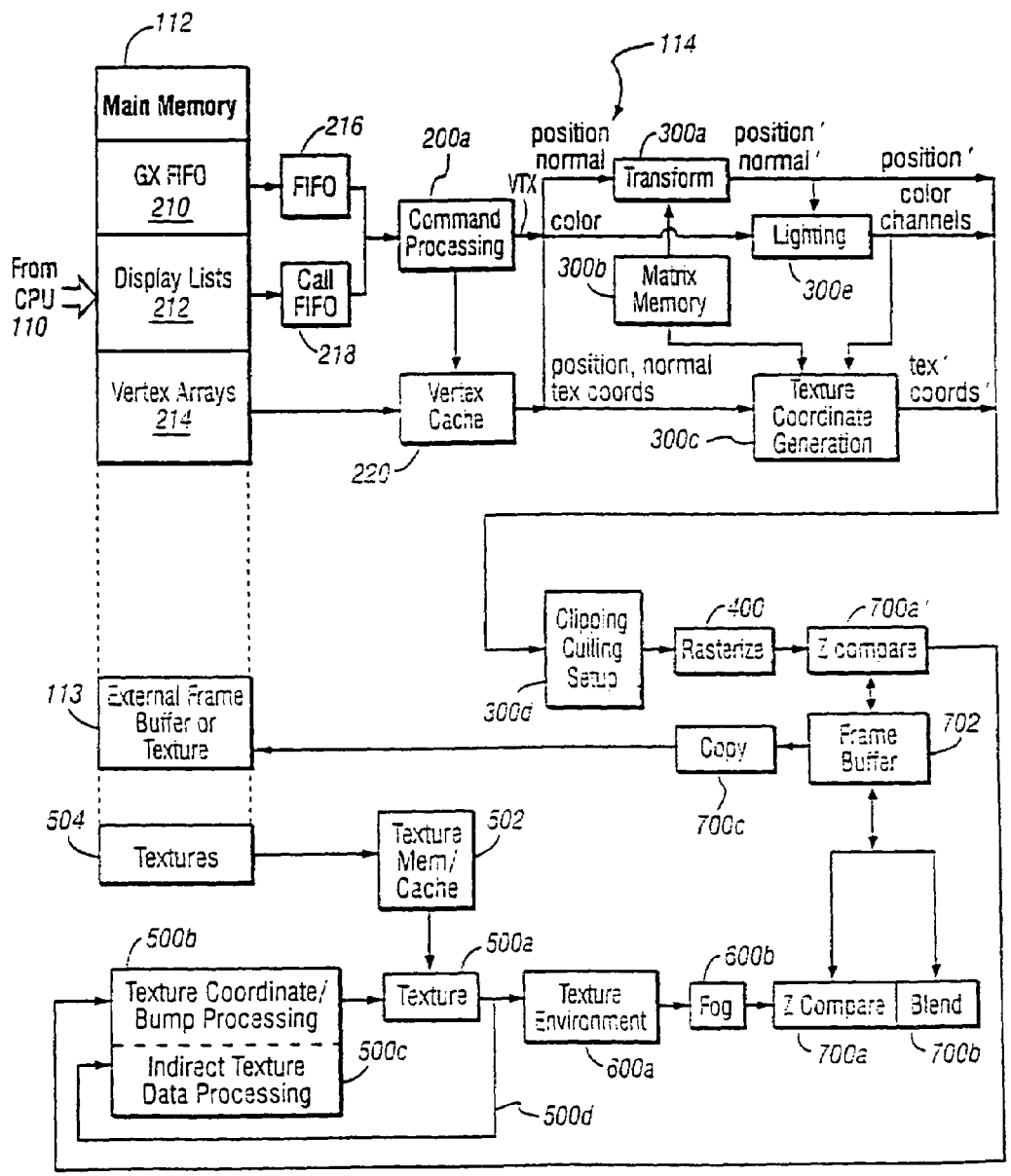
FIG. 5 is an example logical flow diagram of the FIG. 4 graphics and audio processor.

FIG. 5 is a logical flow diagram of graphics processor 154. Main processor 110 may store graphics command streams 210, display lists 212 and vertex arrays 214 in main memory 112, and pass pointers to command processor 200 via bus interface 150. The main processor 110 stores graphics commands in one or more graphics first-in-first-out (FIFO) buffers 210 it allocates in main memory 110. The command processor 200 fetches:

command streams from main memory 112 via an on-chip FIFO memory buffer 216 that receives and buffers the graphics commands for synchronization/flow control and load balancing, display lists 212 from main memory 112 via an on-chip call FIFO memory buffer 218, and vertex attributes from the command stream and/or from vertex arrays 214 in main memory 112 via a vertex cache 220.

Command processor 200 performs command processing operations 200a that convert attribute types to floating point format, and pass the resulting complete vertex polygon data to graphics pipeline 180 for rendering/rasterization. A programmable memory arbitration circuitry 130 (see FIG. 4) arbitrates access to shared main memory 112 between graphics pipeline 180, command processor 200 and display controller/video interface unit 164.

FIG. 4 shows that graphics pipeline 180 may include:
a transform unit 300,
a setup/rasterizer 400,
a texture unit 500,
a texture environment unit 600, and
a pixel engine 700.

Transform unit 300 performs a variety of 2D and 3D transform and other operations 300a (see FIG. 5). Transform unit 300 may include one or more matrix memories 300b for storing matrices used in transformation processing 300a. Transform unit 300 transforms incoming geometry per vertex from object space to screen space; and transforms incoming texture coordinates and computes projective texture coordinates (300c). Transform unit 300 may also perform polygon clipping/culling (300d). Lighting processing 300e also performed by transform unit 300b provides per vertex lighting computations for up to eight independent lights in one example embodiment. As discussed herein in greater detail, Transform unit 300 also performs texture coordinate generation (300c) for emboss-style bump mapping effects.

Setup/rasterizer 400 includes a setup unit which receives vertex data from transform unit 300 and sends triangle setup information to one or more rasterizer units (400b) performing edge rasterization, texture coordinate rasterization and color rasterization.

Texture unit 500 (which may include an on-chip texture memory (TMEM) 502) performs various tasks related to texturing including for example:
retrieving textures 504 from main memory 112,
texture processing (500a) including, for example, multi-texture handling, post-cache texture decompression, texture filtering, embossing, shadows and lighting through the use of projective textures, and BLIT with alpha transparency and depth,
bump map processing for computing texture coordinate displacements for bump mapping, pseudo texture and texture tiling effects (500b), and indirect texture processing (500c).

Texture unit 500 performs texture processing using both regular (non-indirect) and indirect texture lookup operations. A more detailed description of the example graphics pipeline circuitry and procedures for performing regular and indirect texture look-up operations is disclosed in commonly assigned co-pending patent application, Ser. No. 09/722,382, entitled "Method And Apparatus For Direct And Indirect Texture Processing In A Graphics System" and its corresponding provisional application, Ser. No. 60/226,891, filed Aug. 23, 2000, both of which are incorporated herein by reference.

Texture unit 500 outputs filtered texture values to the Texture Environment Unit 600 for texture environment processing (600a). Texture environment unit 600 blends polygon and texture color/alpha/depth, and can also perform texture fog processing (600b) to achieve inverse range based fog effects. Texture environment unit 600 can provide multiple stages to perform a variety of other interesting environment-related functions based for example on color/alpha modulation, embossing, detail texturing, texture swapping, clamping, and depth blending. Texture environment unit 600 can also combine (e.g., subtract) textures in hardware in one pass. For more details concerning the texture environment unit 600, see commonly assigned application Ser. No. 09/722,367 entitled "Recirculating Shade Tree Blender for a Graphics System" and its corresponding provisional application, Ser. No. 60/226,888, filed Aug. 23, 2000, both of which are incorporated herein by reference.

Pixel engine 700 performs depth (z) compare (700a) and pixel blending (700b). In this example, pixel engine 700 stores data into an embedded (on-chip) frame buffer memory 702. Graphics pipeline 180 may include one or more embedded DRAM memories 702 to store frame buffer and/or texture information locally. Z compares 700a' can also be performed at an earlier stage in the graphics pipeline 180 depending on the rendering mode currently in effect (e.g., z compares can be performed earlier if alpha blending is not required). The pixel engine 700 includes a copy operation 700c that periodically writes on-chip frame buffer 702 to main memory 112 for access by display/video interface unit 164. This copy operation 700c can also be used to copy embedded frame buffer 702 contents to textures in the main memory 112 for dynamic texture synthesis effects. Anti-aliasing and other filtering can be performed during the copy-out operation. The frame buffer output of graphics pipeline 180 (which is ultimately stored in main memory 112) is read each frame by display/video interface unit 164. Display controller/video interface 164 provides digital RGB pixel values for display on display 102.

Example Emboss-Style Bump Mapping Texture Coordinate Generation

Figure 6:
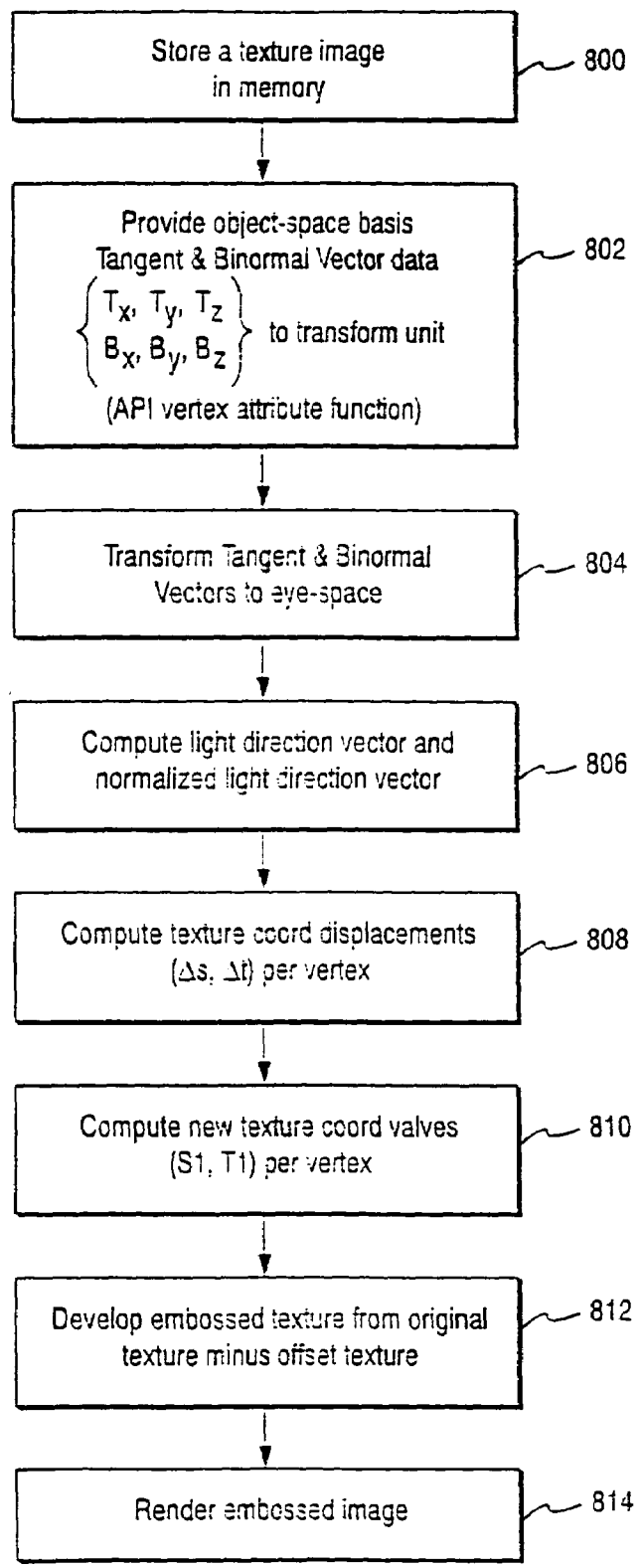
FIG. 6 is a flow chart illustrating example steps for implementing emboss-style bump mapping.

FIG. 6 is a flowchart showing an example set of basic processing steps used to perform emboss bump-mapping in the system described above. In the example embodiment, most of the FIG. 6 steps are performed by Transform Unit 300 based on per-vertex Tangent and Binormal vector data supplied by Command Processor 200. Command Processor 200 may obtain such per-vertex values from main processor 110 and/or from main memory 112.

Briefly, the graphics pipeline renders and prepares images for display at least in part in response to polygon vertex attribute data and texel color data stored as a texture image in an associated memory. The graphics rendering pipeline is provided with vertex transformation and lighting (T&L) hardware that is capable of performing simple bump-mapping operations in addition to the more conventional T&L operations. Pipelined hardware efficiently generates texture coordinate displacements for implementing emboss-style bump-mapping effects utilizing object-space (model-space) surface normals supplied per vertex, for example, by a graphics application running on the main CPU of the graphics system. An enhanced vertex attribute description command function facilitates the communication and processing of plural surface normals per-vertex in addition to other vertex attributes such as vertex position, light source position and texture coordinates. The enhanced vertex attribute function specifies Normal, Tangent and Binormal surface vectors (N, T & B) provided by the host CPU in object space coordinates and uses separate memory indexes per vertex for each of the three surface vectors so as to effectively compress the amount of data needed for bump mapping. A vector geometry processing portion of the T&L hardware is also enhanced by providing two distinct dot-product computation units to transform the Tangent and Binormal surface vectors to eye-space using a scaled model view matrix, compute a light direction vector in eye-space and perform parallel dot-product computations between the computed light direction vector and the transformed Tangent and Binormal vectors to efficiently generate the appropriate texture coordinate displacements for use in creating an embossed texture effect.

In one example embodiment, system 50 first stores a texture image in texture memory 502 (see FIG. 4) for use with the bump mapping operation (block 800). Command Processor 200 then provides object-space basis Tangent and Binormal vector data to transform Transform Unit 300 using vertex attribute functions defined in an appropriate graphics API (block 802). The Transform Unit 300 transforms the Tangent and Binormal vector data to eye space (block 804). Transform Unit 300 also computes a light direction (light-to-vertex) vector and a normalized light direction vector (block 806). Transform Unit 300 then computes texture coordinate displacements and new texture coordinate values per vertex (blocks 808, 810). Texture Environment (TEV) unit 600 develops an embossed texture from the original texture stored in texture memory 502 minus the offset texture defined by the displacements (block 812). In other words, the original texture is looked-up using both non-displaced coordinates (s, t) and displaced coordinates (s+Δs, t+Δt) and the texture values are subtracted per-pixel. The result is combined with per-vertex local diffuse lighting in graphics pipeline 180 and the resulting embossed image is rendered for display on display 56 (block 814). The embossed image results may also be combined with other textures.

In more detail, bump mapping described above generates at least: (1) texture coordinate displacements (Δs, Δt) based on incoming texture coordinates (block 808), (2) a normalized light direction (block 806) and (3) a per-vertex coordinate basis function (block 802). The preferred basis function used is an orthogonal object-space coordinate basis. The three orthogonal axes of this coordinate basis are defined by the surface Normal vector, a surface "Tangent" vector and a second mutually perpendicular surface tangent "Binormal" vector with the Tangent (T) and Binormal (B) vectors oriented in directions corresponding to the texture gradient in s and the texture gradient in t (i.e., increasing s or t). The two orthogonal surface tangent vectors, T and B, are also called "binormals". Block 802 provides these values. An object-space coordinate light vector projected onto this coordinate basis (block 806) is then used to compute texture coordinate displacements for bump-mapping. More specifically, the projection of the light direction vector onto each of the two binormals, T and B, gives the amount of texture space displacement the light causes. Basically, the light on the texture (i. e., the light direction vector) is decomposed into its surface normal component and its (s, t) coordinate components corresponding to the respective texture gradients. These (s, t) coordinate components of the light direction vector are the (Δs, Δt) texture coordinate displacements (block 808) used for bump mapping.

To perform the above operations properly for efficient rendering, object oriented Tangent and Binormal vectors at each vertex, which map in object space to the texture s and t axis, are preferably first converted to eye-space. Consequently, in the example implementation of the present invention, Command Processor 200 supplies these two binormals per-vertex to Transform Unit 300 (block 804). The Transform Unit will then transform the binormals to eye-space (block 804). (For the present example embodiment, even where the supplied binormals are constant, for example, with flat surfaces, Command Processor 200 supplies the binormals to Transform Unit 300 on a per-vertex basis.) Mathematically, the following operations are performed by Transform Unit 300 are:

$$\begin{bmatrix} Tx \\ Ty \\ Tz \end{bmatrix} = ModuleViewNormalMatrix(3 \times 3) \begin{bmatrix} Txv \\ Tyv \\ Tzv \end{bmatrix}$$

$$\begin{bmatrix} Bx \\ By \\ Bz \end{bmatrix} = ModuleViewNormalMatrix(3 \times 3) \begin{bmatrix} Bxv \\ Byv \\ Bzv \end{bmatrix}$$

where Tv=(Txv, Tyv, Tzv) and Bv=(Bxv, Byv, Bzv) are the per-vertex binormals supplied to Transform Unit 300 by Command Processor 200. The Tv vector should preferably be normalized and aligned with the s texture axis in object-space and the Bv vector should preferably be normalized and aligned with the t texture axis in object space. The Model View transformation matrix should be purely rotational, which would maintain the unit length of the binormals. However, if scaling of the binormals is required, then the Model View transformation matrix can be multiplied by a scalar. The scale applied would then be the new unit length of the binormals. This could be used to visually increase the bump mapping, effect without changing the source data or the algorithm.

Given the binormal basis system, the light rotation matrix used by Transform Unit 300 (block 806) is as follows:

$$L_{rot} = \begin{bmatrix} Tx & Ty & Tz \\ Bx & By & Bz \end{bmatrix}$$

where (Tx, Ty, Tz) is the transformed binormal oriented along the s axis, in the direction of increasing s, while (Bx, By, Bz) is the transformed binormal oriented along the t axis, in the direction of increasing t.

The light vector is computed (block 806) by normalizing the difference between the light position (in eye-space) and the current, transformed, vertex in eye space as follows:

$$\begin{bmatrix} Lx \\ Ly \\ Lz \end{bmatrix} = \frac{\begin{bmatrix} Vx - Lpx \\ Vy - Lpy \\ Vz - Lpz \end{bmatrix}}{\left\| \begin{bmatrix} Vx - Lpz \\ Vy - Lpy \\ Vz - Lpz \end{bmatrix} \right\|}$$

The texture coordinate displacement (Δs, Δt) is then computed per-vertex (block 808) as follows:

$$\begin{bmatrix} \Delta s \\ \Delta t \end{bmatrix} = \begin{bmatrix} Tx & Ty & Tz \\ Bx & By & Bz \end{bmatrix} \cdot \begin{bmatrix} Lx \\ Ly \\ Lz \end{bmatrix}$$

Note that this preferred example algorithm does not use the Normal input vector to compute displacements. Only the Binormal and Tangent vectors are required. Other implementations specify a 3×3 matrix multiply including the eye-space Normal as an extra row.

The computed per-vertex delta offsets, (Δs, Δt), are then added to the post-transform (i.e., after transform to eye-space) texture coordinate generated per-vertex (block 810) to obtain new texture coordinates S1 and T1:

$$\begin{bmatrix} S1 \\ T1 \end{bmatrix} = \begin{bmatrix} S0 + \Delta s \\ T0 + \Delta t \end{bmatrix} = \begin{bmatrix} S0 \\ T0 \end{bmatrix} + \begin{bmatrix} Tx & Ty & Tz \\ Bx & By & Bz \end{bmatrix} \cdot \begin{bmatrix} Lx \\ Ly \\ Lz \end{bmatrix}$$

Example Emboss Bump-Mapping Texture Coordinate Generation Hardware Implementation To efficiently implement the above computation for emboss-style bump-mapping, Transform Unit 300 includes hardwired computational logic circuitry to perform at least the following emboss bump-mapping related vector and coordinate computations:

---

Compute $T_{eye} = MV \cdot T$
Compute $B_{eye} = MV \cdot B$
Compute $L = V_{eye} - L_{pos}$
Compute $L^2$
Compute $T_{eye} \cdot L$
Compute $B_{eye} \cdot L$
Compute $1/\|L\| = 1/\text{sqrt}(L^2)$
Compute $\Delta s = T \cdot L/\|L\|$
Compute $\Delta t = B \cdot L/\|L\|$
Compute $(S1, T1) = (S0 + \Delta s, T0 + \Delta t)$

--- where T and B are the respective object-space Tangent and Binormal vectors; MV is a transformation matrix having element values for converting vectors to eye-space; $L_{pos}$ is the light position vector; $V_{eye}$ is the vertex position vector; L is the light-to-vertex vector; $\|L\|$ is the normalized light direction vector; (S0, T0) are the regular transformed texture coordinates, (Δs, Δt), are the generated texture coordinate displacement values; and (S1, T1) are the new texture coordinates from which an "offset" texture used in emboss bump-mapping is obtained.

Figure 7:
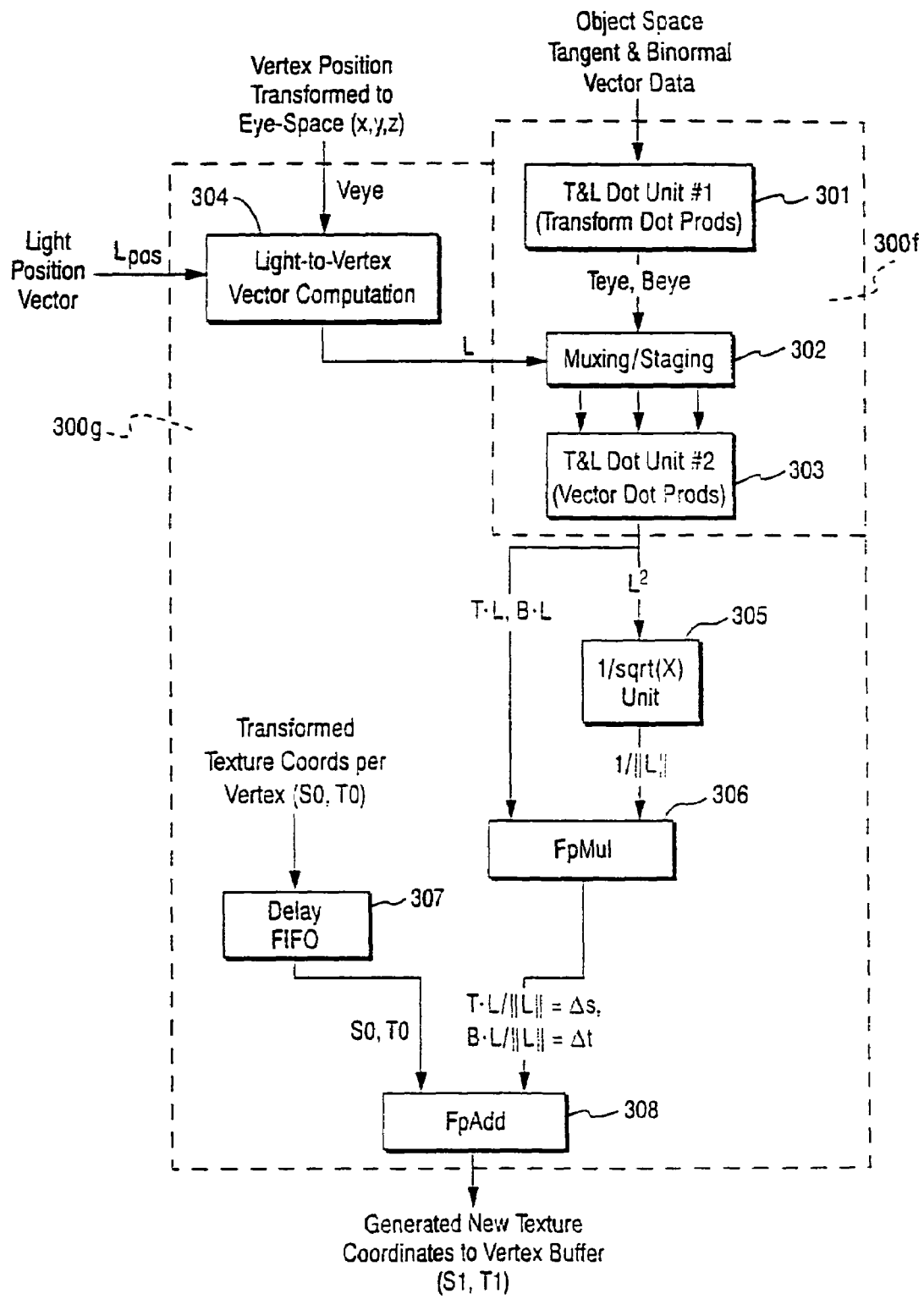
FIG. 7 is an example logic flow diagram of vector processing and bump mapping hardware provided in the Transform unit for implementing emboss-style bump mapping.
Figure 8:
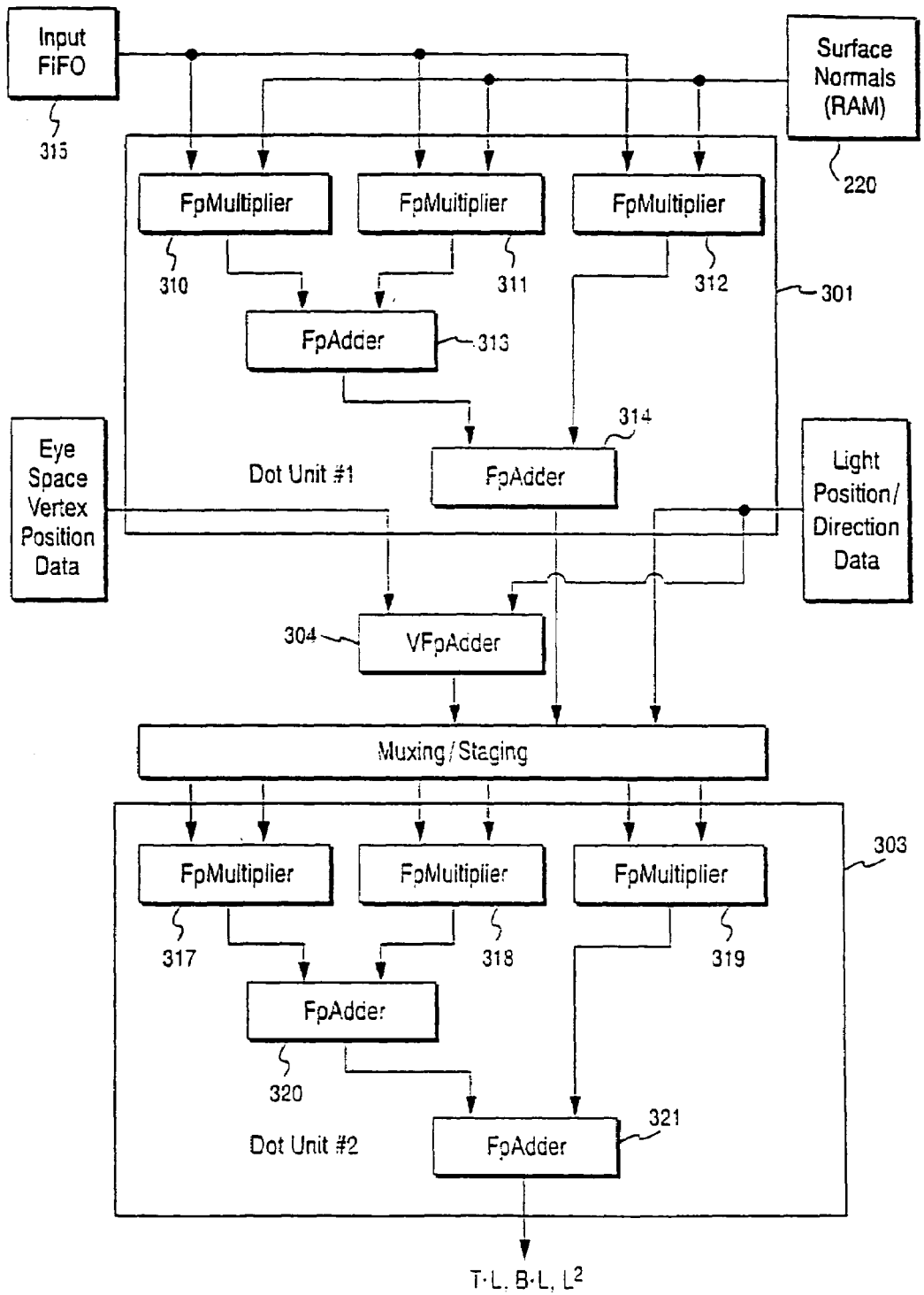
FIG. 8 is a block diagram showing a detailed example of the dot-product computation units and light direction computation hardware provided in the Transform unit for implementing emboss-style bump mapping.

FIG. 7 is a block diagram illustrating the logical flow of functional operations performed by hardware provided in transform unit 300 for efficiently generating the texture coordinate displacements, (Δs, Δt), needed for implementing emboss-style bump mapping. The graphics application running on main processor 110 computes and supplies object-space binormals T and B to transform unit 300 via command processor 200. An enhanced vertex attribute description function of the API (application programming interface) is used which allows specifying Normal, Tangent and Binormal vector data via separate memory indexes per-vertex. Command processor 200 provides this vector data to transform unit 300. In addition to permitting at least three surface normals, the enhanced vertex attribute function allows the programmer to use separate per-vertex memory indexes for each of the three surface normals so as to effectively compress the amount of data needed to be explicitly specified for bump-mapping. As mentioned above, the supplied Tangent and Binormal vectors must map, at each vertex, to the texture s and t axis, in object space. Vector dot-product multiplication circuitry in Transform Unit 300 will then transform these vectors to eye-space, as illustrated by FIGS. 7 and 8.

Referring again to FIG. 7, block 300f outlines specific vector dot-product processing hardware which may also be employed by Transform Unit 300 in performing computations other than that related to emboss-style bump-mapping. While block 300g outlines Transform Unit hardware more specifically useful in emboss bump-mapping computations, block 300g hardware may also be useful in performing other functions. For emboss-style bump-mapping, a first dot-product computation unit, 301, computes the eye-space transformation of the Tangent and Binormal vectors. The transformed results are temporarily stored in multiplexing/staging buffer 302. A light-to-vertex vector computation 304 is performed on vertex position vector data, $V_{eye}$, and light position vector data $L_{pos}$, to provide light direction vector data, L. A second dot-product computation unit 303 is utilized to compute, in parallel, the following:

vector dot-products between light direction vector L and each Binormal vector T and B; and an $L^2$ vector product from light direction vector L.

The $L^2$ vector product is subsequently provided to inverse square-root computation unit 305 for computing an inverse magnitude value of the light direction vector. The Binormal and Tangent vector lighting dot-products T•L and B•L from dot unit 303 are provided to floating multiplier 306 alone with the computed inverse magnitude value of the light direction vector from unit 305. Floating point multiplier 306 then computes the texture coordinate displacements ΔS and ΔT which are passed to floating point adder 308. Transformed texture coordinates S0 and T0 are provided per vertex to delay FIFO 307 and are passed in a timely fashion to floating point adder 308 for combination with computed coordinate displacements ΔS and ΔT. The new texture coordinates generated, S1 and T1, are then passed to a vertex buffer unit (not shown) within transform unit 300 and subsequently passed via graphics pipeline 180 to texture unit 500 for texture lookup. In the preferred embodiment, the texture combining unit used is capable of performing texture subtraction in one pass instead of multiple passes. The preferred texture combining operation does not use an accumulation buffer, but instead does texture combining in texture hardware.

FIG. 8 shows a more detailed diagram of dot-product computation units 301 and 303 and light direction computation hardware within transform unit 300 for performing the emboss bump mapping functions of FIG. 7. A preferred embodiment utilizes digital logic hardware capable of processing at least twenty-bit floating point numerical values. As illustrated in FIG. 8, vector dot unit 301 includes floating point multipliers 310, 311 and 312 coupled to floating adders 313 and 314. The two surface binormals B and T are provided to floating point multipliers 310, 311 and 312 from vertex cash RAM 220 (FIG. 5). Input FIFO 315 receives transformation matrix data for converting the Tangent and Binormal vectors to eye-space from matrix memory 300b and provides the matrix element values to floating point multipliers 310, 311 and 312. Floating point adder 304 performs the light-to-vertex vector computation for determining light direction vector L from transformed eye-space vertex position data and input light position/direction vector data.

Vector dot unit 303 includes floating multipliers 317, 318 and 319 and floating point adders 320 and 321 for computing vector dot products of the light direction vector and the Tangent and Binormal eye space vector components. Dot unit 303 may also include multiplexor 302 for receiving and staging light direction vector and transformed eye-space Tangent and Binormal vector data from floating point adder 304 and dot unit 301. Floating point multipliers 317 through 319 are used in combination with floating point adders 320 and 321 to provide a light direction vector squared product. $L^2$, a Tangent lighting vector dot-product (T•L) and a Binormal lighting dot product (B•L) at the output of floating point adder 321.

A table illustrating an example schedule of computational events for accomplishing emboss-style bump-mapping occurring per pipeline data clocking cycle/stage within Transform Unit 300 using dot unit 301 and dot unit 302 is provided immediately below:

| Cycle # | Vector Dot Unit #1 | $VF_p$ Adder | Vector Dot Unit #2 |
|---|---|---|---|
| 1 | Load T | | |
| 2 | $T_{xe}$ = M0 · T | | |
| 3 | $T_{ye}$ = M1 · T | | |
| 4 | $T_{ze}$ = M2 · T | | |
| 5 | Load B | | |
| 6 | $B_{xe}$ = M0 · B | | |
| 7 | $B_{ye}$ = M1 · B | | |
| 8 | $B_{ze}$ = M2 · B | Lx = Vex − Lpx | |
| 9 | | Ly = Vey − Lpy | |
| 10 | | Lz = Vez − Lpz | |
| 11 | Out $T_{xe}$ | | |
| 12 | Out $T_{ye}$ | | |
| 13 | Out $T_{ze}$ | | |
| 14 | | | Ld $T_{eye}$, L |
| 15 | Out $B_{xe}$ | | Out T · L; Ld L |
| 16 | Out $B_{ye}$ | | Out $L^2$ |
| 17 | Out $B_{ze}$ | | |
| 18 | | | Ld $B_{eye}$ |
| 19 | | | Out B · L |

During, relative cycles/stages numbered 1 through 8, the Tangent and Binormal vectors are loaded into dot unit 301 and the transforms to eye space are computed. During cycles 9 through 11, light direction vector components $L_x$, $L_y$, and $L_z$ are computed by floating point adder 304 using eye space vertex composition components and negative signed light position components. During cycles 11–13, the computed Tangent vector eye space components are loaded into multiplexing/staging buffer 302. During Cycle 14, the computed light direction vector, L, and the computed Tangent eye space vector. Teye=($T_{xe}$, $T_{ye}$, $T_{ze}$), are loading into the vector dot unit 303 for computing the T•L dot product. On cycle 15, the computed light direction vector, L, is again loaded into the vector dot unit 303 to compute the light direction vector squared product, L2. Finally, the binormal eye space vector, Beye=($B_{xe}$, $B_{ye}$, $B_{ze}$) is loaded on cycle 18 to compute the B•L dot product. The hardware described above is fully pipelined and can compute the required values in a minimal number of distinct operations.

Example API Function Commands

In the preferred embodiment, an enhanced graphics API function is used to initiate texture coordinate veneration within transform unit 300. In addition to conventional texture coordinate generation wherein current vertex attribute information is used to generate a texture coordinate, the preferred graphics API supports an enhanced texture generation function that is capable of calling and using other texture coordinate generation functions. An example enhanced API texture coordinate generation function may be defined as follows:

GXSetTexCoordGen

Arguments:
    GXTexCoord Dst_Coord; // name of generated texture coordinates
    GxtexGenType Func; // coordinate generation function type
    GXTexGenSrc Src_param; // Source parameters for coord generation
    u32 MatIdx; // Texture Matrix Index.

The above example API function defines general texture coordinate generation in addition to supporting other texture coordinate generation functions. The MatIdx is set as the default texture matrix index by which the generated texture coordinates are to be transformed. In the present example embodiment, to implement emboss-style bump-mapping, the above API function is used with Func set to GX_TG_BUMP*, where * is a number from 0–7 indicative of one of up to eight possible different lights (light source positions) which may be selected for embossing.

The following is an example C/C++ language implementation of the above general texture coordinate generation function:

```
void GXSetTexCoordGen(
    GXTexCoordID dst_coord,
    GXTexGenType func,
    GXTexGenSrc src_param,
    u32 mtx);
```

With "func" set to GX_TG_BUNIP0–7, system 50 performs emboss-style bump mapping by perturbing input texture coordinates based on per-vertex specified binormals and light direction information. The original and offset texture coordinates are used to look up texels from a height-field bump map texture stored in memory 112. TEV unit 600 can be used to subtract these values in hardware in one pass to find the bump height, which value can be added to the final color of the pixel to provide emboss-style bump mapping. GX_BUMP0 indicates that light 0 will be used, GX_BUMP1 indicates that light 1 will be used, etc., in the bump map calculation.

The dst_coord for bump maps should be numbered sequentially, i.e. base texture coordinate=n, and bump offset texture coordinate=n+1. Bump map texture coordinates should be generated after coordinates generated from transforms (GX_TG_MTX2×4 and GX_TG_MTX3×4) and before coordinates generated from lighting channels (GX_TG_SRTG). An example follows:

// source for a bump mapped coordinate, transformed by a matrix
    GXSetTexCoordGen(GX_TEXCOORD0,
        GX_TG_MTX2×4,
    GX_TG_TEX0, GX_TEXMTX3);
    // perturbed coordinate, offset from TEXCOORD0 above, light 0. Matrix (mtx) is not used for the perturbed coordinates (therefore use an identity matrix).
    GXSetTexCoordGen(GX_TEXCOORD1,
        GX_TG_BUMP0,
    GX_TG_TEXCOORD0, GX_IDENTITY).

Other Example Compatible Implementations

Certain of the above-described system components 50 could be implemented as other than the home video game console configuration described above. For example, one could run graphics application or other software written for system 50 on a platform with a different configuration that emulates system 50 or is otherwise compatible with it. If the other platform can successfully emulate, simulate and/or provide some or all of the hardware and software resources of system 50, then the other platform will be able to successfully execute the software.

As one example, an emulator may provide a hardware and/or software configuration (platform) that is different from the hardware and/or software configuration (platform) of system 50. The emulator system might include software and/or hardware components that emulate or simulate some or all of hardware and/or software components of the system for which the application software was written. For example, the emulator system could comprise a general purpose digital computer such as a personal computer, which executes a software emulator program that simulates the hardware and/or firmware of system 50.

Some general purpose digital computers (e.g., IBM or MacIntosh personal computers and compatibles) are now equipped with 3D graphics cards that provide 3D graphics pipelines compliant with DirectX or other standard 3D graphics command APIs. They may also be equipped with stereophonic sound cards that provide high quality stereophonic sound based on a standard set of sound commands. Such multimedia-hardware-equipped personal computers running emulator software may have sufficient performance to approximate the graphics and sound performance of system 50. Emulator software controls the hardware resources on the personal computer platform to simulate the processing, 3D graphics, sound, peripheral and other capabilities of the home video game console platform for which the game programmer wrote the game software.

Figure 9:
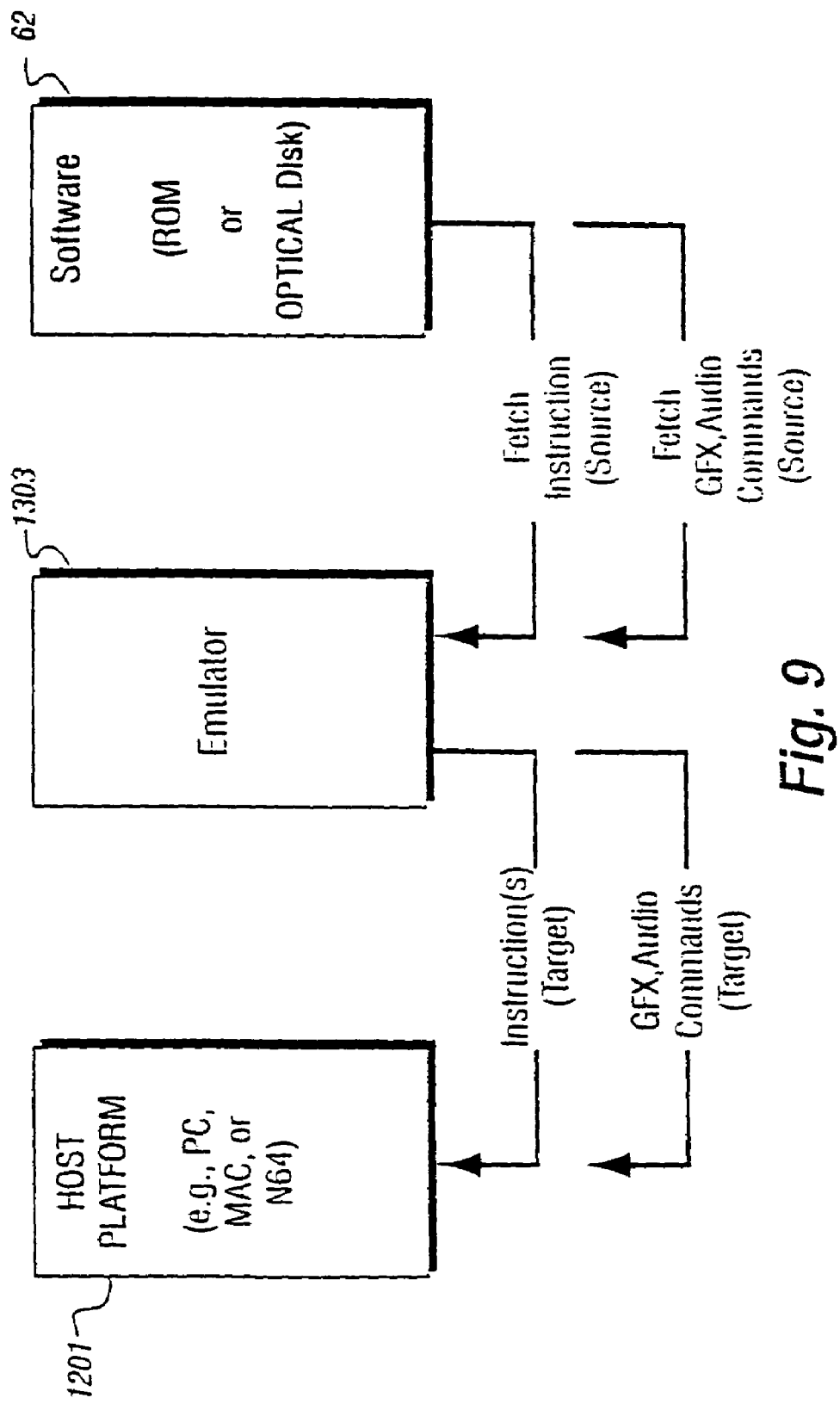
FIGS. 9 and 10 show example alternative compatible implementations.

FIG. 9 illustrates an example overall emulation process using a host platform 1201, an emulator component 1303, and a game software executable binary image provided on a storage medium 62. Host 1201 may be a general or special purpose digital computing device such as, for example, a personal computer, a video game console, or any other platform with sufficient computing power. Emulator 1303 may be software and/or hardware that runs on host platform 1201, and provides a real-time conversion of commands, data and other information from storage medium 62 into a form that can be processed by host 1201. For example, emulator 1303 fetches "source" binary-image program instructions intended for execution by system 50 from storage medium 62 and converts these program instructions to a target format that can be executed or otherwise processed by host 1201.

As one example, in the case where the software is written for execution on a platform using an IBM PowerPC or other specific processor and the host 1201 is a personal computer using a different (e.g. Intel) processor, emulator 1303 fetches one or a sequence of binary-image program instructions from storage medium 62 and converts these program instructions to one or more equivalent Intel binary-image program instructions. The emulator 1303 also fetches and/or generates graphics commands and audio commands intended for processing by the graphics and audio processor 114, and converts these commands into a format or formats that can be processed by hardware and/or software graphics and audio processing resources available on host 1201. As one example, emulator 1303 may convert these commands into commands that can be processed by specific graphics and/or or sound hardware of the host 1201 (e.g., using standard DirectX, OpenGL and/or sound APIs).

An emulator 1303 used to provide some or all of the features of the video game system described above may also be provided with a graphic user interface (GUI) that simplifies or automates the selection of various options and screen modes for games run using the emulator. In one example, such an emulator 1303 may further include enhanced functionality as compared with the host platform for which the software was originally intended. In the case where particular graphics support hardware within an emulator does not include the embossed bump mapping functions shown in FIGS. 7 and 8, the emulator designer has a choice of either:

translating emboss-style bump mapping commands into other graphics API commands the graphics support hardware understands, or implementing the bump mapping functions in software with a potential corresponding decrease in performance depending upon the speed of the processor, or "stubbing" (i.e., ignoring) the bump mapping commands to provide a rendered image that does not include embossed effects.

While the FIG. 6 flowchart can be implemented entirely in software, entirely in hardware or by a combination of hardware and software, the preferred embodiment performs most of these calculations in hardware to obtain increased speed performance and other advantages. Nevertheless, in other implementations (e.g., where a very fast processor is available), the computations and steps of FIG. 6 may be implemented in software to provide similar or identical imaging results.

Figure 10:
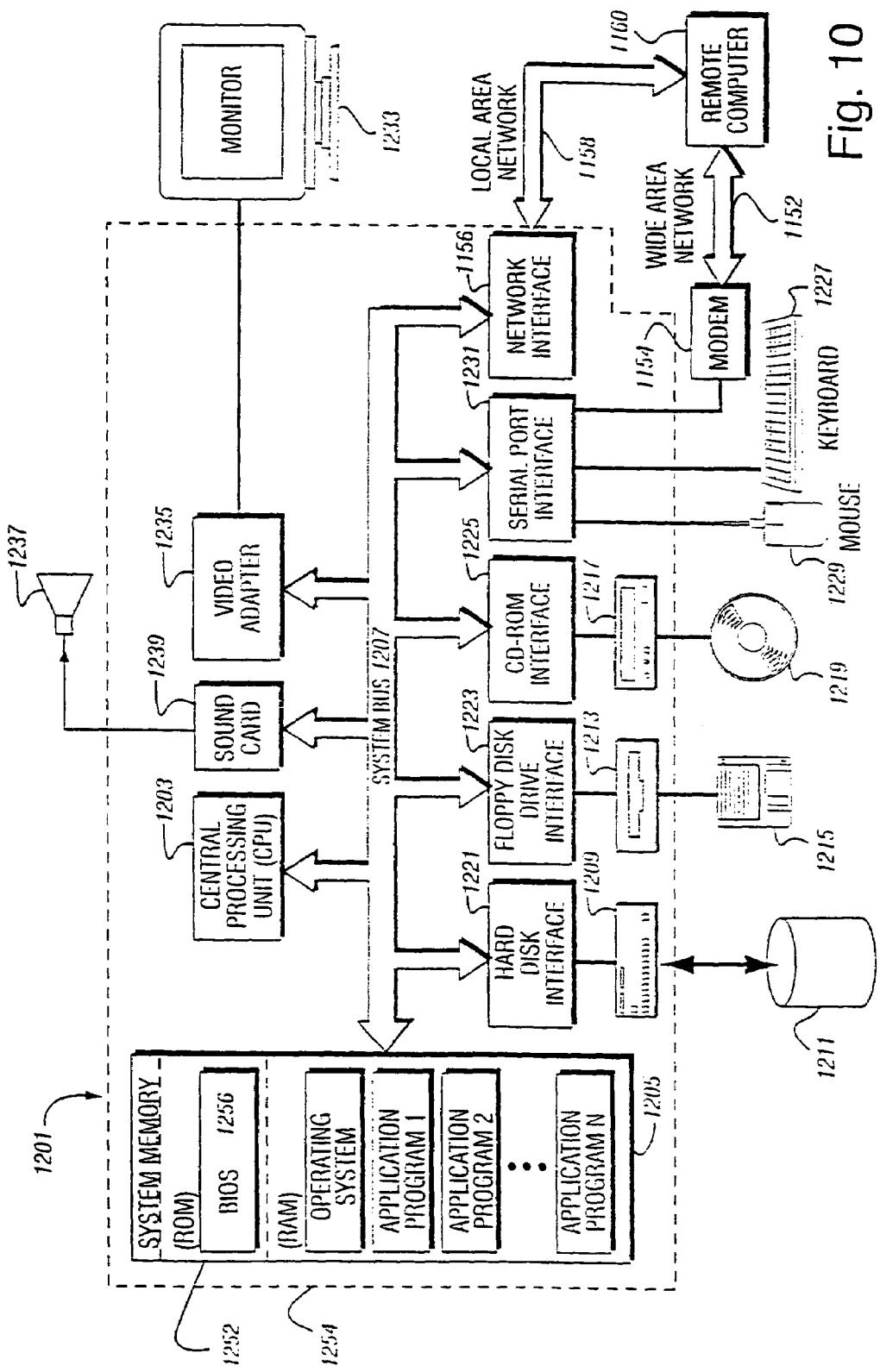

FIG. 10 illustrates an emulation host system 1201 suitable for use with emulator 1303. System 1201 includes a processing unit 1203 and a system memory 1205. A system bus 1207 couples various system components including system memory 1205 to processing unit 1203. System bus 1207 may be any of several types of bus structures including a memory bus or memory controller, a peripheral bus, and a local bus using any of a variety of bus architectures. System memory 1207 includes read only memory (ROM) 1252 and random access memory (RAM) 1254. A basic input/output system (BIOS) 1256, containing the basic routines that help to transfer information between elements within personal computer system 1201, such as during start-up, is stored in the ROM 1252. System 1201 further includes various drives and associated computer-readable media. A hard disk drive 1209 reads from and writes to a (typically fixed) magnetic hard disk 1211. An additional (possible optional) magnetic disk drive 1213 reads from and writes to a removable "floppy" or other magnetic disk 1215. An optical disk drive 1217 reads from and, in some configurations, writes to a removable optical disk 1219 such as a CD ROM or other optical media. Hard disk drive 1209 and optical disk drive 1217 are connected to system bus 1207 by a hard disk drive interface 1221 and an optical drive interface 1225, respectively. The drives and their associated computer-readable media provide nonvolatile storage of computer-readable instructions, data structures, program modules, game programs and other data for personal computer system 1201. In other configurations, other types of computer-readable media that can store data that is accessible by a computer (e.g., magnetic cassettes, flash memory cards, digital video disks, Bernoulli cartridges, random access memories (RAMs), read only memories (ROMs) and the like) may also be used.

A number of program modules including emulator 1303 may be stored on the hard disk 1211, removable magnetic disk 1215, optical disk 1219 and/or the ROM 1252 and/or the RAM 1254 of system memory 1205. Such program modules may include an operating system providing graphics and sound APIs, one or more application programs, other program modules, program data and game data. A user may enter commands and information into personal computer system 1201 through input devices such as a keyboard 1227, pointing device 1229, microphones, joysticks, game controllers, satellite dishes, scanners, or the like. These and other input devices can be connected to processing unit 1203 through a serial port interface 1231 that is coupled to system bus 1207, but may be connected by other interfaces, such as a parallel port, game port Fire wire bus or a universal serial bus (USB). A monitor 1233 or other type of display device is also connected to system bus 1207 via an interface, such as a video adapter 1235.

System 1201 may also include a modem 1154 or other network interface means for establishing communications over a network 1152 such as the Internet. Modem 1154, which may be internal or external, is connected to system bus 123 via serial port interface 1231. A network interface 1156 may also be provided for allowing system 1201 to communicate with a remote computing device 1150 (e.g., another system 1201) via a local area network 1158 (or such communication may be via wide area network 1152 or other communications path such as dial-up or other communications means). System 1201 will typically include other peripheral output devices, such as printers and other standard peripheral devices.

In one example, video adapter 1235 may include a 3D graphics pipeline chip set providing fast 3D graphics rendering in response to 3D graphics commands issued based on a standard 3D graphics application programmer interface such as Microsoft's DirectX 7.0 or other version. A set of stereo loudspeakers 1237 is also connected to system bus 1207 via a sound generating interface such as a conventional "sound card" providing hardware and embedded software support for generating high quality stereophonic sound based on sound commands provided by bus 1207. These hardware capabilities allow system 1201 to provide sufficient graphics and sound speed performance to play software stored in storage medium 62.

All documents referenced above are hereby incorporated by reference.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the scope of the appended claims.

We claim:

1. A method of performing embossed-style bump mapping within a pipelined graphics system using conventional RGB textures comprising:
   providing object space Tangent and Binormal vector data for each of plural vertices of a polygon;
   transforming Tangent and Binormal vectors to eye-space;
   computing an eye-space light direction vector and a normalized light direction vector;
   using dedicated hardware circuitry within the graphics pipeline to compute texture coordinate displacements for each of said vertices as a function of said light direction vector and said normalized light direction vector and said Tangent and Binormal vector data;
   retrieving texture values from a texture memory corresponding to said vertices and to said computed texture coordinate displacements; and
   texture mapping said polygon based on said texture values to provide an embossing effect;
   wherein an embossed texture effect is developed from conventional RGB texture data stored in a texture memory minus an offset texture defined by the computed texture coordinate displacement values.

2. A method as in claim 1 wherein the texture coordinate displacements are computed by hardware within the graphics pipeline without using Normal vector data.

3. A method as in claim 1 wherein the step of using hardware circuitry within the graphics pipeline to compute texture coordinate displacements includes performing vector dot-product computations between the computed light direction vector and the Tangent and Binormal vectors.

4. A method of performing embossed-style bump mapping comprising:
   decoding a texture coordinate generation instruction that specifies generating embossed-style bump-mapping texture displacements;
   converting object oriented Tangent and Binormal vectors per vertex to eye-space;
   using hardware circuitry within a graphics system to compute texture offset coordinates per vertex based on eye-space binormals and light direction information in response to the decoding step;
   adding the per vertex computed texture offset coordinates to eye-space transformed texture coordinates to obtain displaced texture coordinates for up texels in a texture image map; and
   combining texel information obtained using displaced texture coordinates with texel information obtained using non-displaced texture coordinates to provide embossed-style bump mapping;
   wherein the combining step includes combining texel information in texture processing hardware to produce an embossing effect in a displayed image.

5. The method of claim 4 wherein the graphics system hardware circuitry is used to compute the texture coordinate offset values based a Tangent vector and a Binormal vector and a dot-product of each vector with a light direction vector.

6. The method of claim 4 wherein the combining texel information step comprises subtracting texel data acquired using the displaced texture coordinates from texel data acquired using texture coordinates associated with a vertex.

7. The method of claim 4 wherein the decoding step comprises decoding a generalized vertex attribute description function that specifies a Tangent vector and a Binormal vector.

8. The method of claim 7 wherein the Tangent and Binormal vectors are specified by reference to separate memory indexes.

9. In a graphics processing system that renders and displays images at least in part in response to polygon vertex attribute data and texture color data stored in an associated memory, the graphics system including vertex transformation and lighting processing hardware for generating texture coordinate displacement values for implementing at least embossed-style bump-mapped texture effects, the vertex transformation and lighting processing hardware comprising:
   a first vector dot-product computation unit for transforming vector data to eye-space;

a second vector dot-product computation unit for computing lighting direction vector dot-products;
an inverse square-root computation unit for computing a reciprocal of a square-root of an input value;
at least one floating point multiplier unit; and
at least one floating point adder unit;
wherein in response to an API embossed-style bump mapping function instruction the vertex transformation and lighting processing hardware transforms object space Tangent and Binormal vector data per-vertex into eye-space, computes texture coordinate displacement values based on lighting direction vector dot-products, and adds the displacement values to texture coordinates for use in producing emboss-style bump-mapped texture effects.

10. The graphics processing system of claim 9 further including a graphics API vertex attribute function which specifies at least Normal, Tangent and Binormal vectors per vertex, or specifies an index to at least each of these vectors stored in memory.

11. The graphics processing system of claim 9 wherein the API embossed-style bump mapping function is defined to specify one of at least eight different textures for producing embossing effects.

12. The graphics processing system of claim 9 wherein the Normal, Tangent and Binormal vectors each comprise three 32-bit vector elements.

* * * * *